US010620905B2

(12) United States Patent
Helwani et al.

(10) Patent No.: US 10,620,905 B2
(45) Date of Patent: *Apr. 14, 2020

(54) HEARING DEVICE INCORPORATING USER INTERACTIVE AUDITORY DISPLAY

(71) Applicant: Starkey Laboratories, Inc., Eden Prairie, MN (US)

(72) Inventors: Karim Helwani, Eden Prairie, MN (US); Tao Zhang, Eden Prairie, MN (US); Simon Carlile, Berkeley, CA (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/193,380

(22) Filed: Nov. 16, 2018

(65) Prior Publication Data

US 2019/0087150 A1 Mar. 21, 2019

Related U.S. Application Data

(63) Continuation of application No. 15/447,735, filed on Mar. 2, 2017, now Pat. No. 10,133,544.

(51) Int. Cl.
*G06F 3/16* (2006.01)
*H04S 7/00* (2006.01)
(Continued)

(52) U.S. Cl.
CPC .............. *G06F 3/165* (2013.01); *G06F 3/012* (2013.01); *G06F 3/0481* (2013.01); *G06F 3/167* (2013.01);
(Continued)

(58) Field of Classification Search
None
See application file for complete search history.

(56) References Cited

U.S. PATENT DOCUMENTS 6,961,439 B2 11/2005 Ballas
8,417,703 B2 4/2013 Xiang et al.
(Continued)

FOREIGN PATENT DOCUMENTS

CN 101999067 3/2011
EP 2293598 7/2013
(Continued)

OTHER PUBLICATIONS

Corteel et al., Sound Scene Creation and Manipulation using Wave Field Synthesis, 2004, 19 pages.
(Continued)

*Primary Examiner* — Qin Zhu
(74) *Attorney, Agent, or Firm* — Mueting, Raasch & Gebhardt, P.A.

(57) ABSTRACT

A hearing device comprises a processor configured to generate a virtual auditory display comprising a sound field, a plurality of disparate sound field zones, and a plurality of quiet zones that provide acoustic contrast between the sound field zones. The sound field zones and the quiet zones remain positionally stationary within the sound field. One or more sensors are configured to sense a plurality of inputs from the wearer. The processor is configured to facilitate movement of the wearer within the sound field in response to a navigation input received from the one or more sensors. The processor is also configured to select one of the sound field zones for playback via a speaker or actuation of a hearing device function in response to a selection input received from the one or more sensors.

25 Claims, 16 Drawing Sheets

(51) Int. Cl.

| | | |
|---|---|---|
| *G06F 3/0481* | (2013.01) | |
| *G06F 3/01* | (2006.01) | |
| *H04R 25/00* | (2006.01) | |
| *H04R 5/033* | (2006.01) | |
| *H04R 3/00* | (2006.01) | |

(52) U.S. Cl.
CPC .......... *H04R 25/40* (2013.01); *H04R 25/505* (2013.01); *H04R 25/552* (2013.01); *H04R 25/554* (2013.01); *H04S 7/30* (2013.01); *H04S 7/304* (2013.01); *H04R 5/033* (2013.01); *H04S 2400/11* (2013.01); *H04S 2420/01* (2013.01)

(56) References Cited

U.S. PATENT DOCUMENTS

| | | | |
|---|---|---|---|
| 8,923,995 | B2 | 12/2014 | Lindahl et al. |
| 9,389,829 | B2 | 7/2016 | Donaldson et al. |
| 2002/0006206 | A1 | 1/2002 | Scofield |
| 2003/0018477 | A1 | 1/2003 | Hinde |
| 2005/0117753 | A1 | 6/2005 | Miura et al. |
| 2005/0281410 | A1 | 12/2005 | Grosvenor et al. |
| 2009/0262949 | A1 | 10/2009 | Dunko |
| 2010/0290636 | A1* | 11/2010 | Mao ................. H04S 7/304 381/74 |
| 2012/0014525 | A1 | 1/2012 | Ko et al. |
| 2012/0106744 | A1 | 5/2012 | Kambe |
| 2013/0202131 | A1 | 8/2013 | Kemmochi et al. |
| 2014/0002580 | A1* | 1/2014 | Bear ................. H04N 5/445 348/14.07 |
| 2014/0198936 | A1 | 7/2014 | Higgins et al. |
| 2014/0321680 | A1 | 10/2014 | Takahashi et al. |
| 2015/0033123 | A1 | 1/2015 | Arrasvuon et al. |
| 2015/0100991 | A1 | 4/2015 | Risberg |
| 2015/0124975 | A1 | 5/2015 | Pontoppidan |
| 2015/0348377 | A1 | 12/2015 | Kauffmann |
| 2015/0382096 | A1 | 12/2015 | Lamar et al. |
| 2017/0070838 | A1 | 3/2017 | Helwani et al. |
| 2017/0188169 | A1 | 6/2017 | Chon et al. |
| 2017/0374317 | A1* | 12/2017 | Sun ................. H04N 7/147 |
| 2019/0014433 | A1* | 1/2019 | Magariyachi ............ H04S 7/304 |

FOREIGN PATENT DOCUMENTS

| | | |
|---|---|---|
| EP | 2908550 | 8/2015 |
| WO | 2016/131064 | 8/2016 |

OTHER PUBLICATIONS de Vries et al., "Wave field synthesis and analysis using array technology," Proc. 1999 IEEE Workshop on Applications of Signal Processing to Audio and Acoustics, New Paltz, New York, Oct. 17-20, 1999, 4 pages.

Dicke, "A Holistic Design Concept for Eyes-Free Mobile Interfaces", PhD Thesis, University of Canterbury, 2012, 288 pages.

Helwani et al., "The synthesis of sound figures," Multidimensional Systems and Signal Processing, Feb. 25, 2014: 379-403.

Jerome, "Acoustic field representation, application to the transmission and the reproduction of complex sound environments in a multimedia context," PhD Thesis, University of Paris 6, 2000.

Looney et al. "The in-the-ear recording concept: User-centered and wearable brain monitoring," Pulse, IEEE 3.6, 2012, pp. 32-42.

Manabe et al., "Automatic drift calibration for eog-based gaze input interface," in Engineering in Medicine and Biology Society (EMBC), 2013 35th Annual International Conference of the IEEE, Jul. 2013, pp. 53-56.

O'Sullivan et al. "Attentional selection in a cocktail party environment can be decoded from single-trial EEG." Cerebral Cortex 25.7, 2015, pp. 1697-1706.

Spors et al., "Local sound field synthesis by virtual acoustic scattering and Time-Reversal," Audio Engineering Society Convention 131. Audio Engineering Society, 2011, 15 pages.

Taghizadeh, et al., "Euclidean distance matrix completion for ad-hoc microphone array calibration" Digital Signal Processing (DSP), 2013 18th International Conference on IEEE, 2013, 53 pages.

Zai et al., "Reconstruction of audio waveforms from spike trains of artificial cochlea models", Frontiers in Neuroscience, 9, Oct. 13, 2015, 13 pages.

Office Action dated Dec. 27, 2019 for CN Application No. 201810175654.6.

* cited by examiner

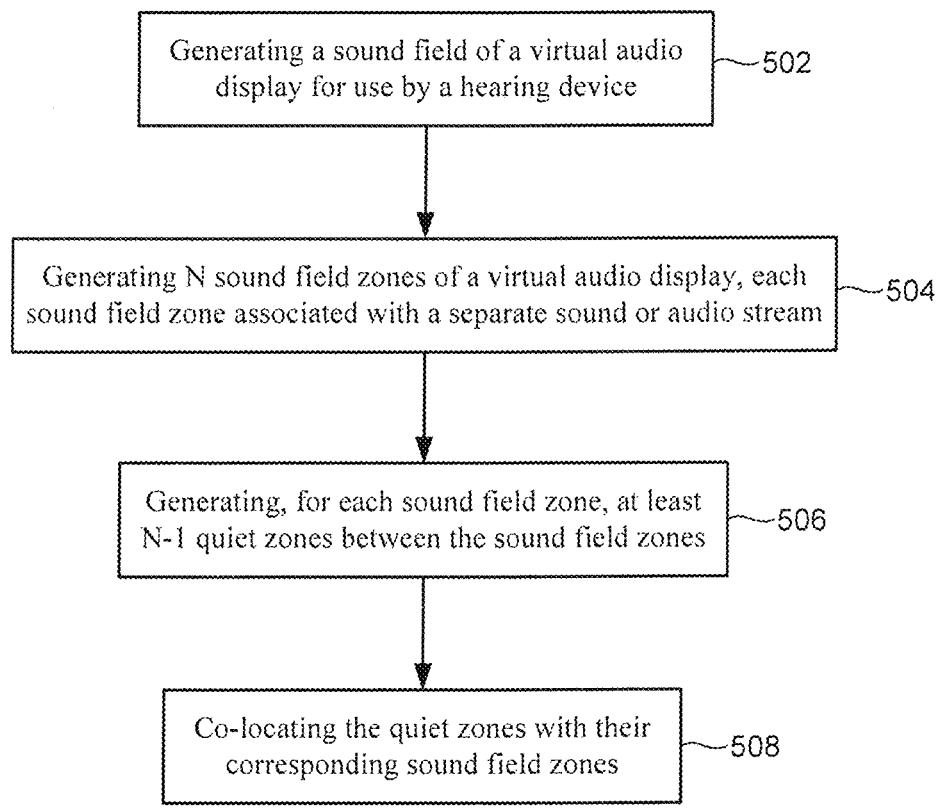

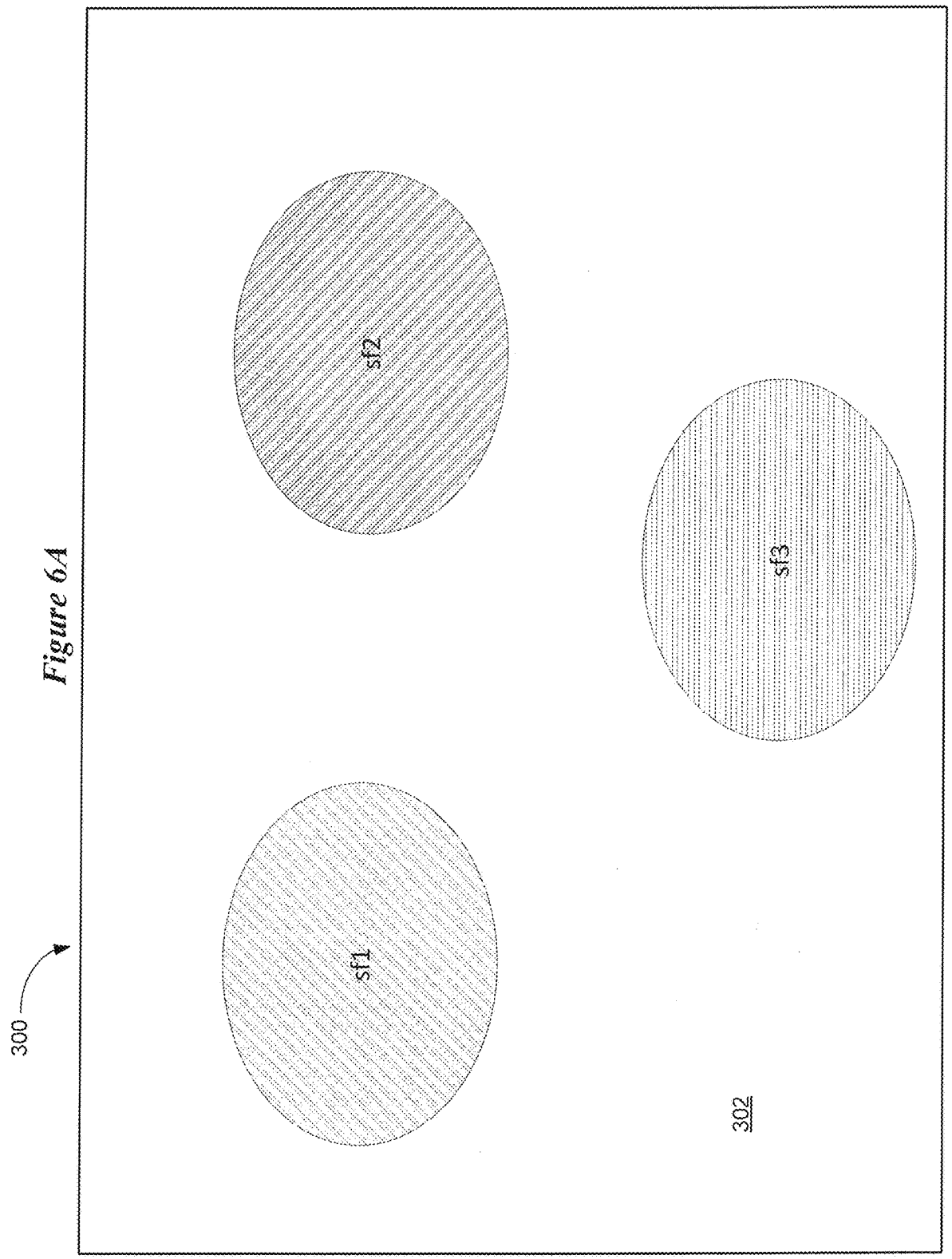

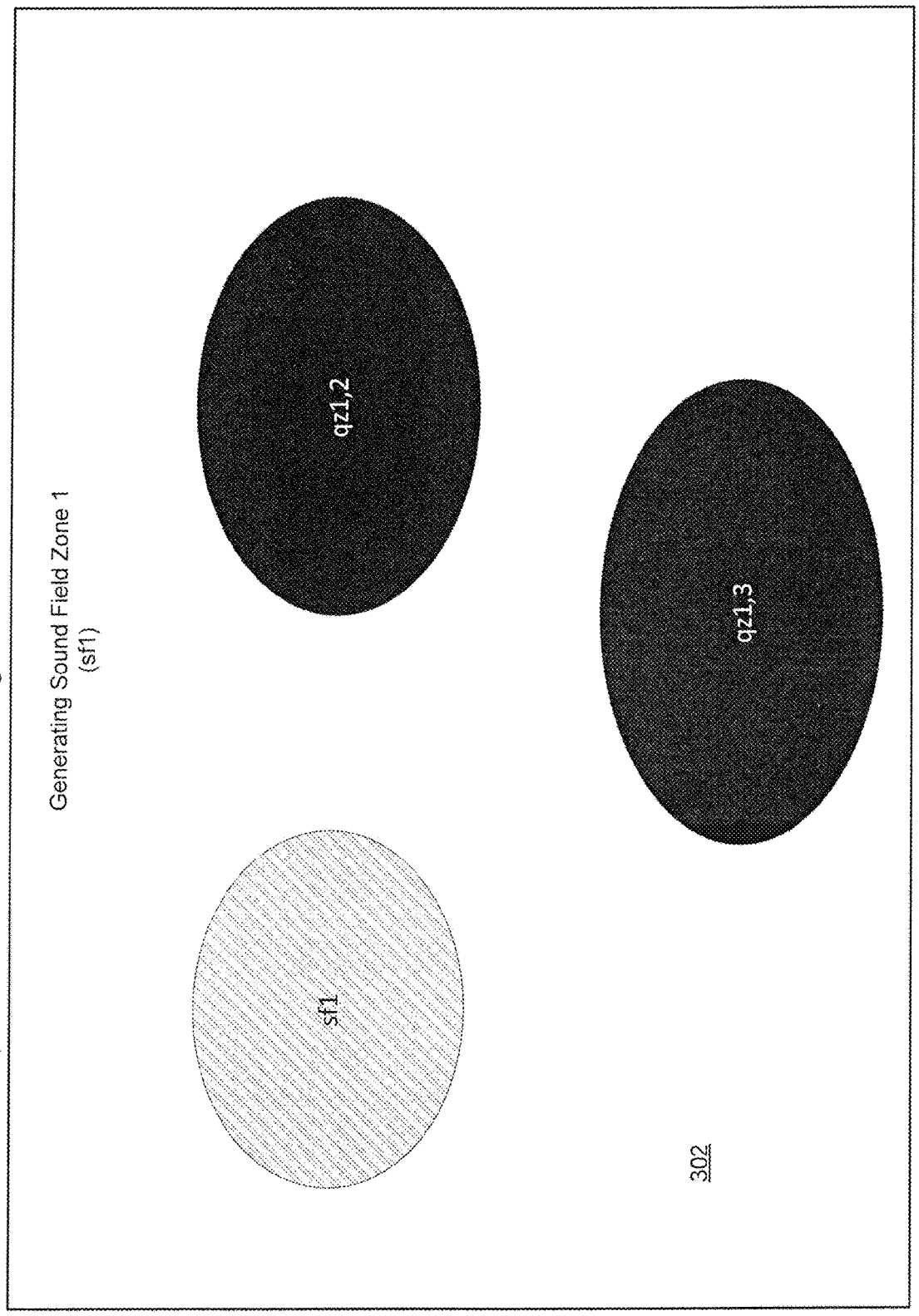

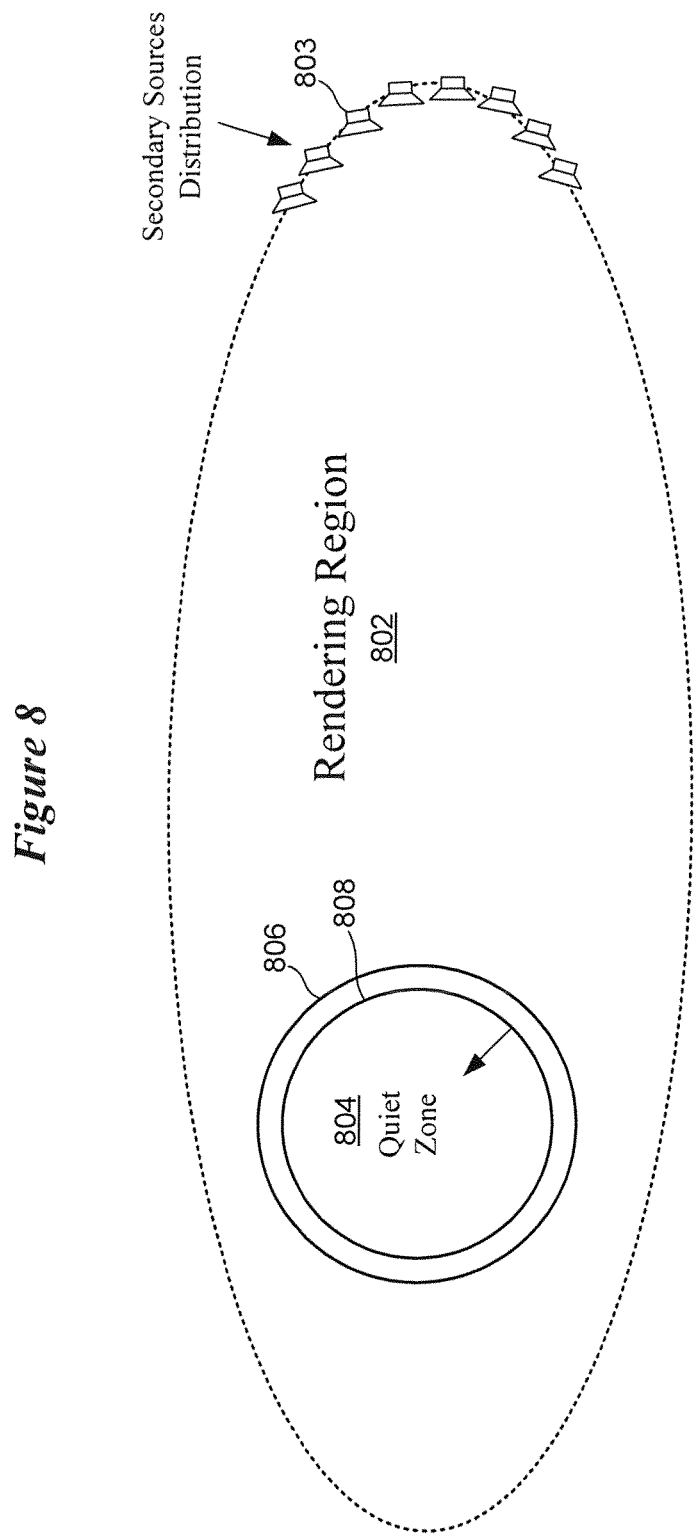

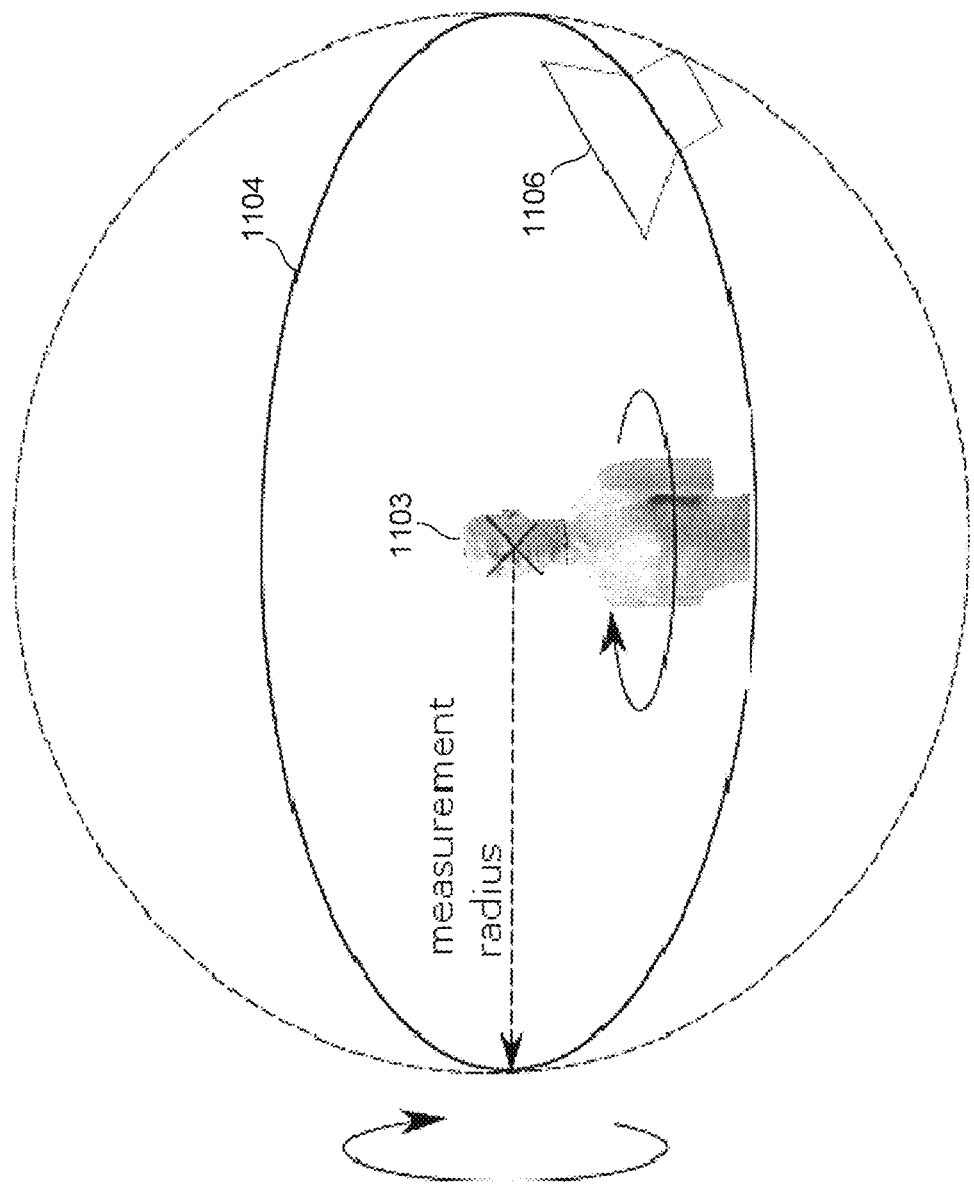

HEARING DEVICE INCORPORATING USER INTERACTIVE AUDITORY DISPLAY

RELATED PATENT DOCUMENTS

This application is a continuation of U.S. application Ser. No. 15/447,735 filed on Mar. 2, 2017, which is incorporated herein by reference in its entirety.

TECHNICAL FIELD

This application relates generally to hearing devices, including hearing aids, personal amplification devices, and other hearables.

BACKGROUND

Hearing devices can incorporate a number of electromechanical switches and control that allow a user to interact with the hearing device. Because the switches and controls are limited in number and are often out of sight while wearing the hearing devices, conventional approaches to interacting with the hearing device are cumbersome and limited in functionality.

SUMMARY

Various embodiments are directed to a method for generating a virtual auditory display by a hearing device arrangement adapted to be worn by a wearer. According to some embodiments, a method involves generating, by the hearing device arrangement, a virtual auditory display comprising a sound field, a plurality of disparate sound field zones, and a plurality of quiet zones that provide acoustic contrast between the sound field zones. The sound field zones and the quiet zones remain positionally stationary within the sound field. The method involves sensing an input from the wearer via a sensor at the hearing device arrangement, and facilitating movement of the wearer within the sound field in response to a navigation input received from the sensor. The method also involves selecting one of the sound field zones for playback to the wearer or actuation of a function by the hearing device arrangement in response to a selection input received from the sensor.

According to other embodiments, a hearing device arrangement comprises a pair of hearing devices configured to be worn by a wearer. Each hearing device comprises a processor configured to generate a virtual auditory display comprising a sound field, a plurality of disparate sound field zones, and a plurality of quiet zones that provide acoustic contrast between the sound field zones. The sound field zones and the quiet zones remain positionally stationary within the sound field. A sensor is configured to sense a plurality of inputs from the wearer. The processor is configured to facilitate movement of the wearer within the sound field in response to a navigation input received from the sensor. The processor is also configured to select one of the sound field zones for playback via a speaker or actuation of a hearing device function in response to a selection input received from the sensor.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings wherein:

FIG. 5 is a flow diagram of a method implemented by an auditory display in accordance with various embodiments;

FIGS. 6A-6D illustrate a process of generating sound field zones and quiet zones of an auditory display in accordance with various embodiments;

FIG. 8 illustrates a rendering setup for generating a sound field of an auditory display with a quiet zone in accordance with various embodiments;

FIG. 11 is an illustration of a traditional setup for measuring head-related transfer functions (HRTFs);

DETAILED DESCRIPTION

Figure 1:
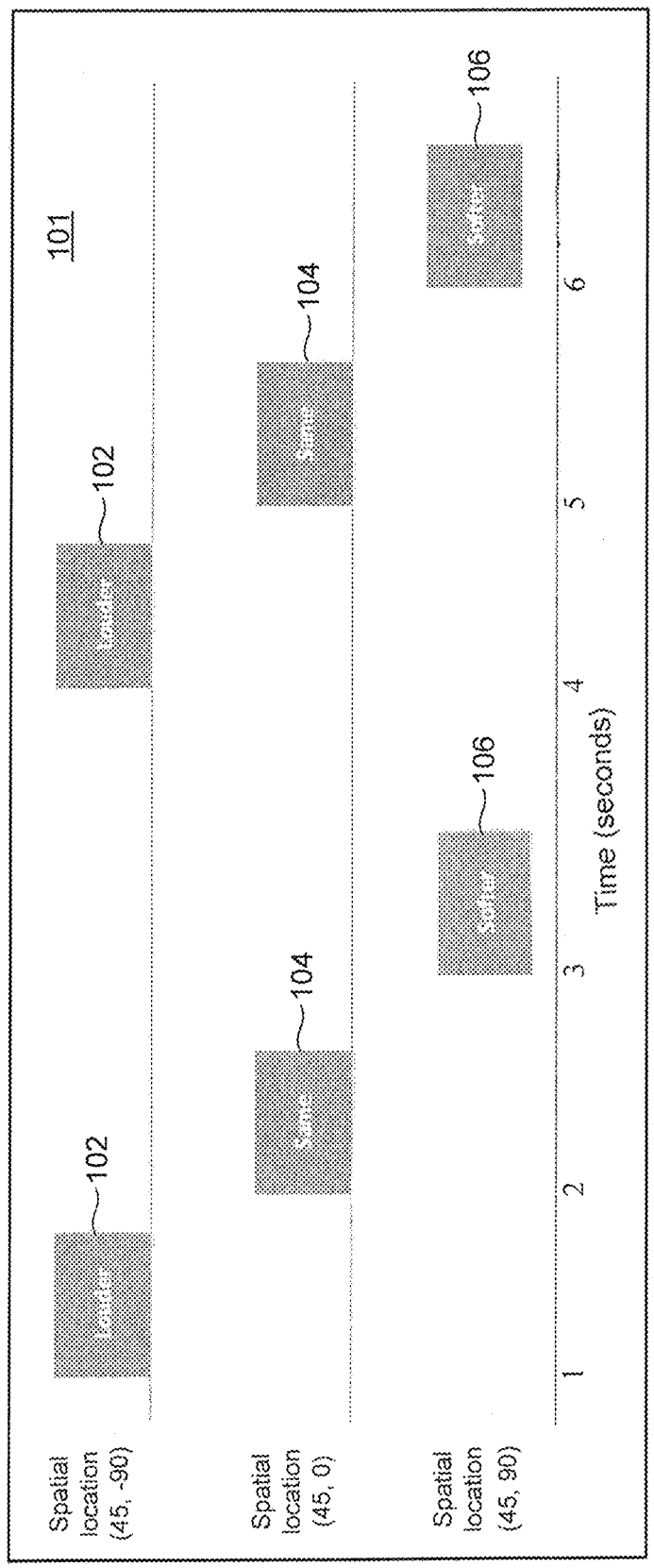
FIG. 1 illustrates an auditory display in time comprising three audio icons for the purpose of adjusting loudness in accordance with various embodiments.

It is understood that the embodiments described herein may be used with any hearing device without departing from the scope of this disclosure. The devices depicted in the figures are intended to demonstrate the subject matter, but not in a limited, exhaustive, or exclusive sense. It is also understood that the present subject matter can be used with a device designed for use in or on the right ear or the left ear or both ears of the wearer.

Hearing devices, such as hearing aids and hearables (e.g., wearable earphones), typically include an enclosure, such as a housing or shell, within which internal components are disposed. Typical components of a hearing device can include a digital signal processor (DSP), memory, power management circuitry, one or more communication devices (e.g., a radio, a near-field magnetic induction device), one or more antennas, one or more microphones, and a receiver/speaker, for example. More advanced hearing devices can incorporate a long-range communication device, such as a Bluetooth® transceiver or other type of radio frequency (RF) transceiver.

Hearing devices of the present disclosure can incorporate an antenna arrangement coupled to a high-frequency radio, such as a 2.4 GHz radio. The radio can conform to an IEEE 802.11 (e.g., WiFi®) or Bluetooth® (e.g., BLE, Bluetooth® 4.2 or 5.0) specification, for example. It is understood that hearing devices of the present disclosure can employ other radios, such as a 900 MHz radio.

Hearing devices of the present disclosure are configured to receive streaming audio (e.g., digital audio data or files) from an electronic or digital source. Representative electronic/digital sources (also referred to herein as accessory devices) include an assistive listening system, a TV streamer, a radio, a smartphone, a cell phone/entertainment device (CPED) or other electronic device that serves as a source of digital audio data or files. An electronic/digital source may also be another hearing device, such as a second hearing aid. Wireless assistive listening systems, for example, are useful in a variety of situations and venues where listening by persons with impaired hearing have difficulty discerning sound (e.g., a person speaking or an audio broadcast or presentation). Wireless assistive listening systems can be useful at venues such as theaters, museums, convention centers, music halls, classrooms, restaurants, conference rooms, bank teller stations or drive-up windows, point-of-purchase locations, and other private and public meeting places.

The term hearing device refers to a wide variety of devices that can aid a person with impaired hearing. The term hearing device also refers to a wide variety of devices that can produce optimized or processed sound for persons with normal hearing. Hearing devices of the present disclosure include hearables (e.g., wearable earphones, headphones, earbuds, virtual reality headsets), hearing aids (e.g., hearing instruments), cochlear implants, and bone-conduction devices, for example. Hearing devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Hearing devices can also be referred to as assistive listening devices in the context of assistive listening systems. Throughout this disclosure, reference is made to a "hearing device," which is understood to refer to a single hearing device or a pair of hearing devices.

Embodiments of the disclosure are directed to hearing devices that incorporate a user interactive auditory display. The term "auditory display" refers to a system that synthesizes a sound field comprising spatial representations of separate audio signals. These spatial representations can be referred to as sound field zones. Some sound field zones are associated with a specified sound, such as speech or music. Some sound field zones are zones of quiet (e.g., zones lacking or substantially lacking sound). Some sound field zones, such as those associated with a specified sound, serve as sound icons. Sound icons can be activatable by a wearer of the hearing device, resulting in playback of a specified sound (e.g., a song) or actuation of a function performed by or in cooperation with the hearing device. An auditory display of the present disclosure incorporates one or more sensors that allow a wearer of a hearing device to interact with the sound field which can present an audio menu of sound icons. The wearer can navigate through the sound field and select between different sound icons presented in the sound field for purposes of playing back desired audio signals or actuating different functions of the hearing device.

According to some embodiments, an auditory display of a hearing device arrangement is implemented as an on-demand interface. The auditory display can be activated and deactivated by the wearer of the hearing device as desired. Activation and deactivation of the auditory display can be implemented in response to a user input. For example, the hearing device can be programmed to listen for a specified voice command (e.g., "activate display," "deactivate display") and activate or deactivate the audio display in response thereto. One or more sensors of the hearing device can be used to detect an activate or deactivate input from the wearer. By way of further example, nodding of the head twice in a left direction in quick succession can be detected by an accelerometer of the hearing device as an activation input. Nodding of the head twice in a right direction in quick succession can be detected by the accelerometer as a deactivation input.

A wearer of a hearing device often needs to adjust operation of the hearing device in the field. Existing hearing devices typically do not have any visual display and can only afford a couple of miniature mechanical or optical controls for user adjustment due to space limitations. In addition, manipulating such miniature controls on hearing devices without the ability to see the controls is challenging. As hearing device functionality becomes more complex and sophisticated, demands for more user options are increasing. Remote controls and smartphones have been offered to meet such demands. However, such approaches require the wearer to carry an extra device which adds cost and inconvenience. As a result, it is desirable to create a user interface for hearing devices that does not require an extra device, is easy to use, and supports the increasing needs for a more sophisticated user interface.

In a traditional human-computer user interface, user options are presented as different visual icons on a computer screen. Here, a visual icon refers to one or more visual images grouped into different zones logically on the screen. In contrast to visual displays, an auditory display of the present disclosure presents user options in the form of sequential or simultaneous sound icons. A sound icon refers to one or more sounds that is/are associated with an independent spatial zone in a binaurally rendered sound field. A collection of spatially organized sound icons can be referred to as a soundscape. A soundscape comprising a collection of spatially organized sound icons represents an auditory display according to various embodiments.

FIG. 1 illustrates an auditory display in accordance with various embodiments. In FIG. 1, a wearer of a hearing device is presented with an auditory display 100 configured to facilitate user adjustment of the volume of the device. The auditory display 100 generates a sound field 101 that contains three different sound icons 102, 104, and 106. Sound icon 102 (louder), when selected, allows the wearer to increase the volume of the hearing device. Sound icon 104 (same), when selected, allows the wearer to maintain the same volume of the hearing device. Sound icon 106 (softer), when selected, allows the wearer to decrease the volume of the hearing device.

Each of the sound icons 102, 104, and 106 is presented at a different spatial location (elevation, azimuth) in the sound field 101 and at a different time. For example, the louder icon 102 is presented at spatial location (45°, −90°), such that the wearer will hear the word "louder" from an upper left direction at time instant 1. At time instant 2, the same icon 104 is presented at spatial location (45°, 0°), such that the wearer will hear the word "same" from an upper middle direction. At time instant 3, the softer icon 106 is presented at spatial location (45°, 90°), such that the wearer will hear the word "softer" from an upper right direction. This sequence of sound icon presentation is repeated until the wearer responds to one of the options. In response to selecting one of the sound icon options, the hearing device automatically adjusts the volume in accordance with the selected option.

Figure 2A:
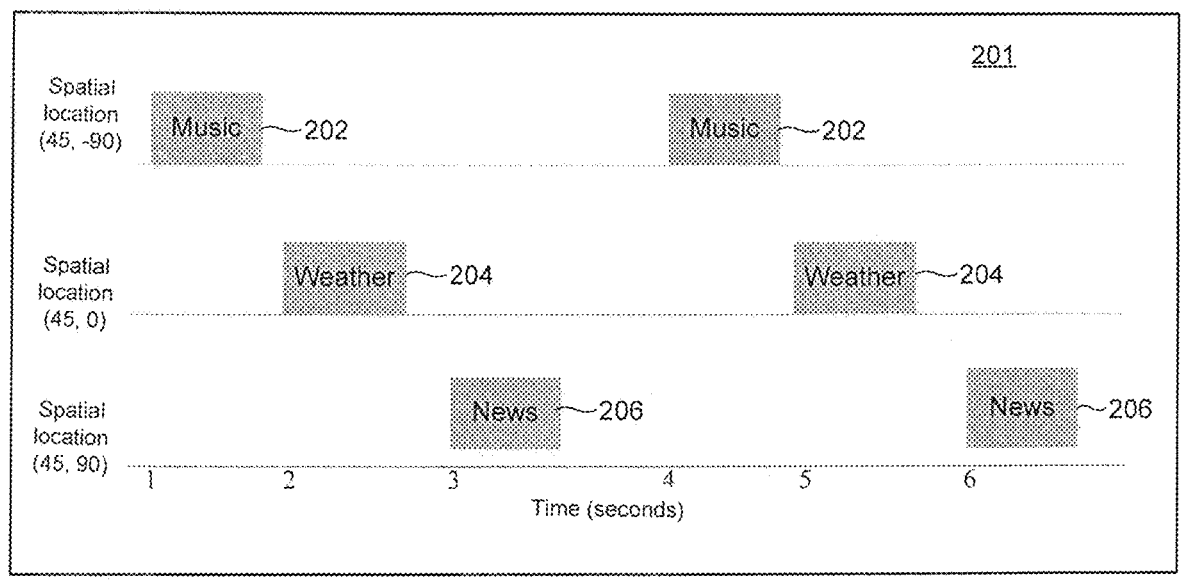
FIGS. 2A and 2B illustrate an auditory display in time comprising three audio icons for the purpose of selecting audio content for playback in accordance with various embodiments.

The sound icons populating a sound field of an auditory display can be organized and presented in a hierarchical manner. Some sound icons can trigger a subset of sound icons. For example, and with reference to FIGS. 2A and 2B, an auditory display 200 is presented allowing the wearer to select between a number of different sound icons. In FIG. 2A, a top-level menu of sound icons is presented which allows the wearer to select between a music icon 202, a weather icon 204, and a news icon 206. As in the case of the embodiment shown in FIG. 1, each of the different sound icons 202, 204, 206 is presented at a different spatial location within the sound field 201 and at a different time. In this illustrative example, the wearer selects the music icon 202.

Figure 2B:
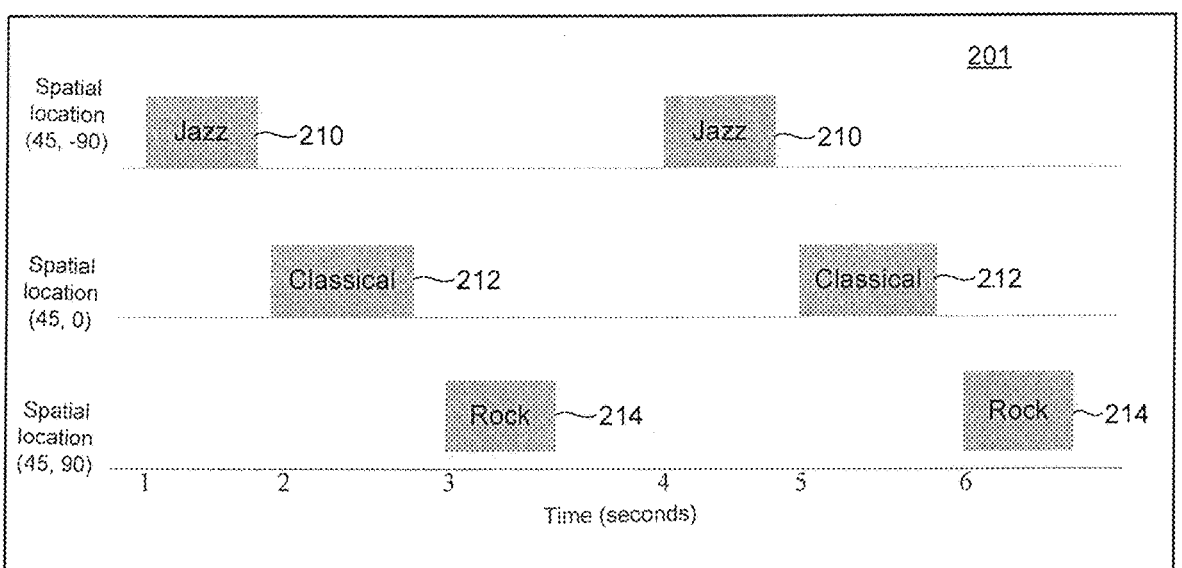

In response to selecting the music icon 202, a subset of music icons 210, 212, and 214 is presented at different spatial locations within the sound field 201 and at different times. As shown in FIG. 2B, the subset of music icons includes a jazz icon 210, a classical icon 212, and a rock icon 214. After selecting the jazz icon 210, for example, a subset of jazz icons can be presented in the sound field 201. For example, a number of different jazz artists or jazz genres can be displayed for selection and actuation by the wearer. Additional icon subsets for individual jazz songs can be presented in one or more subsequent menus presented in the sound field 201.

A sound icon presented in a sound field can be any sound perceivable by the wearer. For example, a sound icon can be a natural voice or a synthetic voice from a familiar or preferred person. A sound icon can be a natural or synthetic sound, such as bird sounds, ocean wave sounds, stream sounds, or computer-generated sounds. A sound icon can also be music. It is understood that a sound icon is not limited to the sounds listed above. In some embodiments, the preferences, favorites, and feeds for the auditory display can be optionally synchronized with a different device that cooperates with the hearing device, such as a mobile phone or a PC with a dedicated application installed on such devices.

The arrangement of sound icons in the sound field of an auditory display can be implemented in an adaptive manner, such that most frequently selected icons are closest in terms of spatial location to the "user attention resting point" within the sound field. This way, the average scroll effort of the wearer is minimized. The number of the sound icons rendered in the sound field can be optimized based on the cognitive load of the wearer. For example, the hearing device can incorporate an electroencephalographic (EEG) sensor that can sense an EEG signal from the wearer. The cognitive load of the wearer can be inferred from the EEG signal and the sound icons can be arranged based on the wearer's mood inferred from the wearer's voice based on emotion detection algorithms. For example, if the wearer is sad, a sound icon with the wearer's favorite melancholic music can be rendered next to the wearer's current position in the sound field.

To improve efficiency, the sound icons within a sound field can be selected and arranged based on the wearer's intention via one of the following means: a keyword spoken by the wearer and recognized by the hearing device via automatic speech recognition; a keyword thought/imagined by the wearer and recognized by the hearing device via brain decoding including, but not limited to, use of an EEG signal.

It is important to recognize that the above efficiency measure should be used judiciously as excessive use can result in confusions or a sense of being lost.

In a traditional human-computer user interface, the user navigates through the user interface by visually browsing through the different visual icons on the computer screen either automatically or with the aid of mouse scrolling and clicking. In accordance with various embodiments, user navigation of an auditory display is based on analyzing one or more of a bioelectrical signal, biomechanical movement or voice command. For example, a wearer can navigate an auditory display by listening and recognizing the different sound icons in the soundscape either automatically with an adjustable speed or by evaluating one of the following wearer inputs. One wearer input involves detection of deliberate eye movement or eye lid movement using an electrooculogram (EOG) signal sensed by an EOG sensor in the hearing device. Another wearer input involves detection of deliberate head movement via one or more inertia sensors of the hearing device, such as an accelerometer or a gyroscope. A further wearer input involves recognition of a voice command from the wearer, via a microphone and voice recognition algorithm implemented by a processor of the hearing device. Another wearer input involves recognition of a command thought imagined by the wearer via brain decoding including, but not limited to, use of an EEG sensor of the hearing device.

When navigating a wearer's actual or virtual movement through a sound field by evaluating a wearer command, it is possible to present more sound icons within the sound field in an organized way in order not to overwhelm the wearer with too many sound icons at a given time. For example, an eye movement from right to left from the wearer can trigger the presentation of another set of sound icons in the given context.

In a traditional human-computer interface, the user indicates his or her selection by pressing a key on the keyboard or implementing a mouse click on a visual icon presented on the computer screen. The computer responds to the user selection by providing a visual change on the selected visual icon, a sound or both. According to various embodiments, the wearer selects an option presented by the auditory display by one of the following means. The wearer can utter a keyword which is recognized by the hearing device via automatic speech recognition. A keyword thought imagined by the wearer can be recognized by the hearing device via brain decoding including, but not limited to, use of an EEG sensor of the hearing device. Wearer selection of an option can be implemented by detection of a fixation dependent microsaccade pattern or intentional gazes in the EOG signal produced by an EOG sensor of the hearing device. Detection of a wearer's attention can be based on an EEG signal. More particularly, a wearer's EEG signal can be analyzed, frequency shifted, and filtered for equalization. The envelope of sound streams of each sound icon can be correlated with that of the equalized EEG signal. The sound stream with the highest correlation is selected.

Embodiments of the disclosure are directed to auditory displays that provide more user options not only by representing the sound spatially, e.g., binaurally, but also in manners inspired by code-, time- or frequency-multiplexing, particularly in embodiments that use an EEG signal. For example, two sound icons within a sound field can have the same spatial location, but the sound content is distinguishable. This can be achieved via frequency-multiplexing such that the two sound icons have different distinct spectra (e.g., one icon is playing a male voice and another is playing a female voice). This can be achieved via code-multiplexing such that the two sound icons have different audio content (e.g., one icon is music while another is speech, or one icon is an English signal and another is a German signal). This can be achieved via time-multiplexing such that the two sound icons are placed at the same location but are time interleaved such that they never emit sound in the same time.

Spatializing the sound in an auditory display has recently gained interest. However, existing spatialization approaches are based on a free field assumption. That is, existing spatialization approaches rely on the wearer's ability to solve the "cocktail party problem" in a binaurally rendered sound field, limit the number of the wearer options in the auditory display, and often lead to a confusing soundscape to the wearer. For existing binaurally rendered sound sources, the residuals of a source while facing another one is determined by the free field propagation of the sources and the head scattering.

To ensure a clear and easy perception of different sound sources in the soundscape, it is important to control the spatial extension of these sound sources by rendering a multizone sound field and control the potential cross-talk among different sound field zones. Embodiments of the disclosure are directed to synthesizing a sound field with zones of quiet using an array of virtual loudspeakers, which is equivalent to synthesizing a sound field with hard sound boundaries. As a result, an adjustable crosstalk capability can be achieved by varying the admittance of the virtual boundaries of each sound field zone. Because only binaural rendering is feasible in a hearable device, the sound field synthesis can be accomplished in two steps according to various embodiments: (1) synthesize the sound field using virtual loudspeakers; and (2) filter the virtual loudspeakers signals with a set of head related transfer functions (HRTF). Details of these and other processes involving various embodiments of an auditory display are provided hereinafter.

Figure 3:
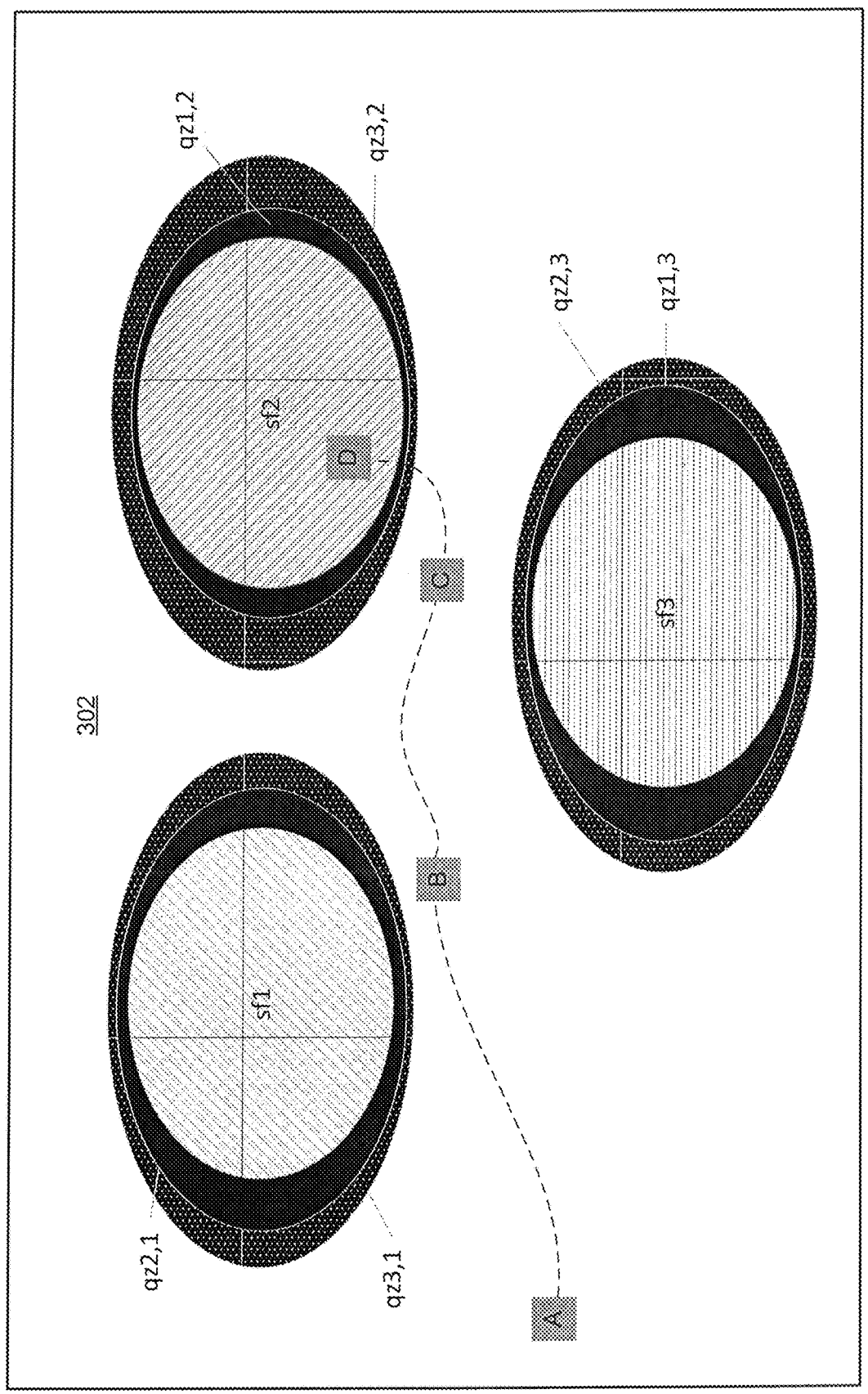
FIG. 3 illustrates an example sound field and quiet zone configuration for a virtual auditory display in accordance with various embodiments.

Turning now to FIG. 3, there is illustrated a representative sound field and quiet zone configuration for a virtual auditory display in accordance with various embodiments. More particularly, FIG. 3 graphically illustrates various features of an auditory display that are sonically perceivable by a wearer of a hearing device. According to various embodiments, a hearing device arrangement is configured to generate a virtual auditory display 300 comprising a sound field 302. The sound field 302 includes a number of disparate sound field zones, sf1, sf2, and sf3. It is understood that three sound field zones are shown in FIG. 3 for purposes of illustration and not of limitation. Each of the sound field zones, sf1, sf2, and sf3, is associated with a separate sound, such as any of the sounds described herein. For example, one or more of the sound field zones sf1, sf2, and sf3 can be associated with a separate audio stream (e.g., music, speech, natural sounds, synthesized sounds) received by the hearing device via a transceiver of the device.

In addition to a number of different sound field zones sf1, sf2, and sf3, the sound field 302 includes a number of quiet zones (qzi,j), where i represents the $i^{th}$ quiet zone and j represent the $j^{th}$ sound field zone. In the representative embodiment shown in FIG. 3, the sound field 302 includes two quiet zones for each of the sound field zones sf1, sf2, and sf3. In general, a sound field 302 can include N disparate sound field zones and at least N−1 quiet zones. The quiet zones (qzi,j) provide increased acoustic contrast between the sound field zones sf1, sf2, and sf3. The quiet zones can be viewed as hard sound boundaries between the sound field zones sf1, sf2, and sf3. As will be described in greater detail, the sound field 302, which includes sound field zones and quiet zones, is synthesized by the hearing device using an array of virtual loudspeakers. A detailed description concerning the generation of sound field zones and quiet sounds of a sound field is provided below with reference to FIGS. 6A-6D.

As is discussed above, FIG. 3 is a visual representation of an auditory display of the present disclosure. The sound field zones sf1, sf2, and sf3 represent spatially non-interfering acoustic zones. In each sound field zone, a sound is synthesized with individual characteristics such as waveform propagation, (e.g., plane wave with a specific angle of incidence), frequency range or specific content (speech, music, tonal signals). Each sound field zone corresponds to specific audio content or a menu option. According to various embodiments, the sound field zones sf1, sf2, and sf3, and quiet zones (qzi,j) remain positionally stationary within the sound field 302. Rather than fixing the wearer at the center of the sound field 302, the auditory display is configured to facilitate free movement of the wearer within the sound field 302.

One or more sensors of the hearing device sense a user input corresponding to a navigation input or a selection input. The wearer of the hearing device can navigate through the sound field 302 by appropriate gestures, voice commands or thought sensed by the sensors of the hearing device. The wearer may select a particular sound field zone by an appropriate gesture, voice command or thought, which activates the selected zone. The selected zone may be a menu option or a sound (e.g., a song or verbal podcast). Accordingly, the auditory display 300 does not necessarily place the listener in the center of the synthesized sound field 302 as is the case using conventional spatialization techniques. Rather, the wearer can effectively move through (virtually or actually) the perspective-free sound field 302. Through navigation, the wearer chooses his or her perspective.

The auditory display 300 is implemented to expose the wearer of a hearing device to different spatial audio content with controlled acoustic contrast. The experience of the wearer when navigating the sound field 302 can be compared to the synthesis of the sound in a corridor of a music conservatorium comprising separate music rooms. In this illustrative scenario, the sound from each separated room is mixed with different level and character at the listener's ear. The listener can walk through the corridor and listen to the different played materials and finally choose the room he or she prefers to enter. Choosing a room in this regard is equivalent to choosing a menu option that can result in selecting a specific hearing device configuration or starting a specific activity with the hearing device, such as playing an audio book or listening to the news.

In FIG. 3, the three sound field zones sf1, sf2, and sf3 can represent three different genres of music, such as jazz (sf1), classical (sf2), and rock (sf3). As is shown in FIG. 3, the wearer enters the sound field 302 at location A. At location A, the wearer can hear each of the sound fields sf1, sf2, and sf3 at different spatial locations of the sound field 302 and at different amplitudes based on the spatial distance of each zone from location A. The sounds emanating from the sound field zones sf1, sf2, and sf3 are spatially non-interfering with each other due to the presence of quiet zones (qzi,j) that provide acoustic contrast between the sound field zones sf1, sf2, and sf3. The three different genres of music can be played back to the wearer sequentially or simultaneously.

From location A, the wearer can provide a user input to select the desired sound field zone, such as jazz sound field zone sf1.

In response to selecting the sound field zone sf1, a subset of sound icons can replace the sound field zones sf1, sf2, and sf3 in the sound field 302. This subset of sound icons can represent different sub-genres of jazz, such as traditional, swing, smooth, West Coast, New Orleans, big band, and modern. The wearer can select a sound icon of a desired sub-genre of jazz, and another subset of sound icons representing different jazz artists can populate the sound field 302. The jazz artist sound icons may be implemented to play back the name of each jazz artist in a sequential or simultaneous manner. After selecting a desired jazz artist, sound icons for individual songs associated with the selected jazz artist can be presented in the sound field 302. The wearer may then select a specific song icon for playback.

The functionality described hereinabove regarding the selection of desired music can be implemented for configuring the hearing device. For example, an initial set of sound icons for controlling different functions of the hearing device can be presented in the sound field 302. The wearer can provide a user input to select a desired function, such as volume adjustment. The sound field 302 can then be populated by sound icons that allow for the adjustment of volume, such as the icons shown in FIG. 1.

In addition to the functionality described hereinabove, the auditory display 300 can be implemented to facilitate movement of the wearer within the sound field 302 via one or more sensors of the hearing device. Movement within the sound field 302 can be virtual or actual. As the wearer moves within the sound field 302, the wearer-perceived amplitude and directionality of sound emanating from the sound field zones sf1, sf2, and sf3 is adjusted in response to the wearer's movement. As the wearer moves from location A to location B, the sound emanating from sound field zone sf1 increases in amplitude relative to the sound emanating from sound field zones sf2 and sf3. As the wearer moves from location B to location C, the wearer perceives a diminishment in the amplitude of sound from sound field zone sf1, and an increase in the amplitude of sound from sound field zones sf2 and sf3. Moving from location C, the wearer decides to select the sound field zone sf2 (classical), which is indicated as location D of the wearer. Additional menus of sound icons can then be presented in the sound field 302 in response to selecting the sound field zone sf2.

Figure 4:
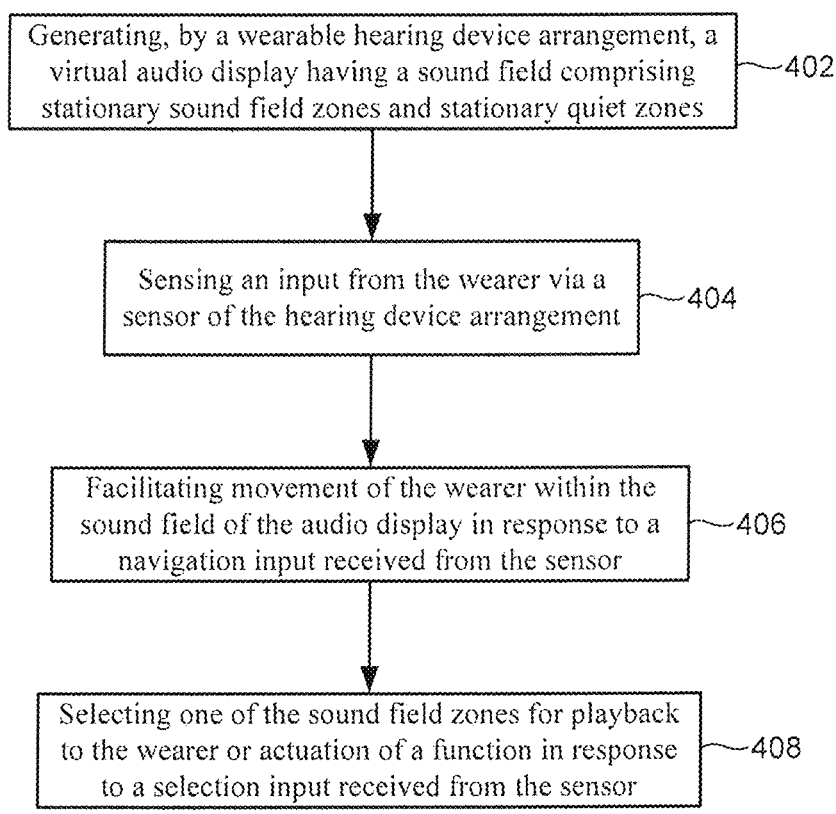
FIG. 4 is a flow diagram of a method implemented by an auditory display in accordance with various embodiments.

FIG. 4 is a flow diagram of a method implemented by an auditory display in accordance with various embodiments. The processes shown in FIG. 4 summarize those discussed above with reference to FIG. 3. The method of FIG. 4 involves generating 402, by a wearable hearing device arrangement, a virtual audio display having a sound field comprising stationary sound field zones and stationary quiet zones. The method involves sensing 404 an input from the wearer via a sensor of the hearing device arrangement. The method also involves facilitating movement 406 of the wearer within the sound field of the audio display in response to a navigation input received from the sensor. The method further involves selecting 408 one of the sound field zones for playback to the wearer or actuation of a function in response to a selection input received from the sensor.

FIG. 5 is a flow diagram of a method implemented by an auditory display in accordance with other embodiments. The method shown in FIG. 5 involves generating 502 a sound field of a virtual audio display for use by a hearing device. The method involves generating 504 N sound field zones of a virtual audio display, such that each sound field zone is associated with a separate sound or audio stream. The method also involves generating 506, for each sound field zone, at least N−1 quiet zones between the sound field zones. The method further involves co-locating 508 the quiet zones with their corresponding sound field zones.

Figure 6C:
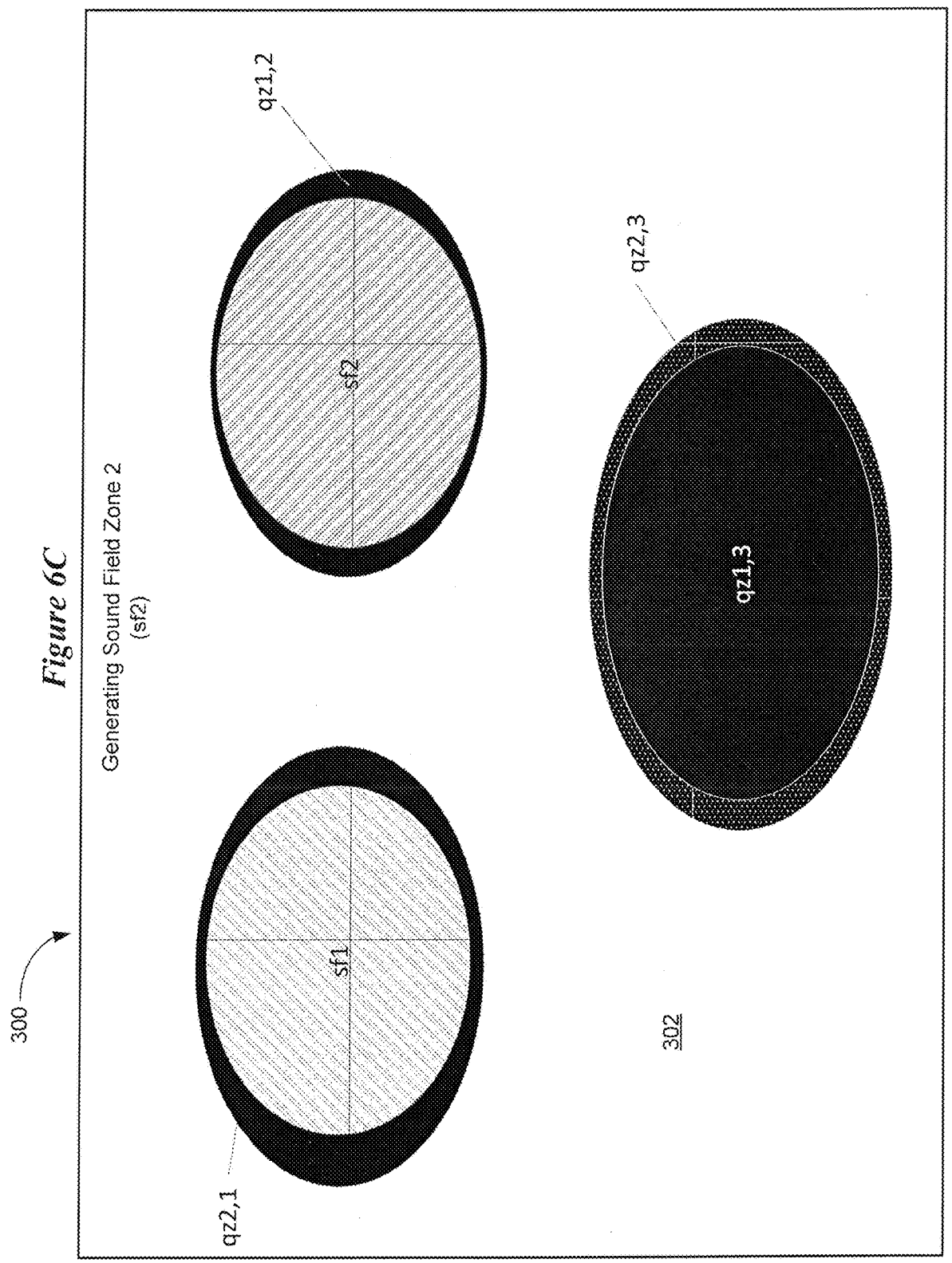
Figure 6D:
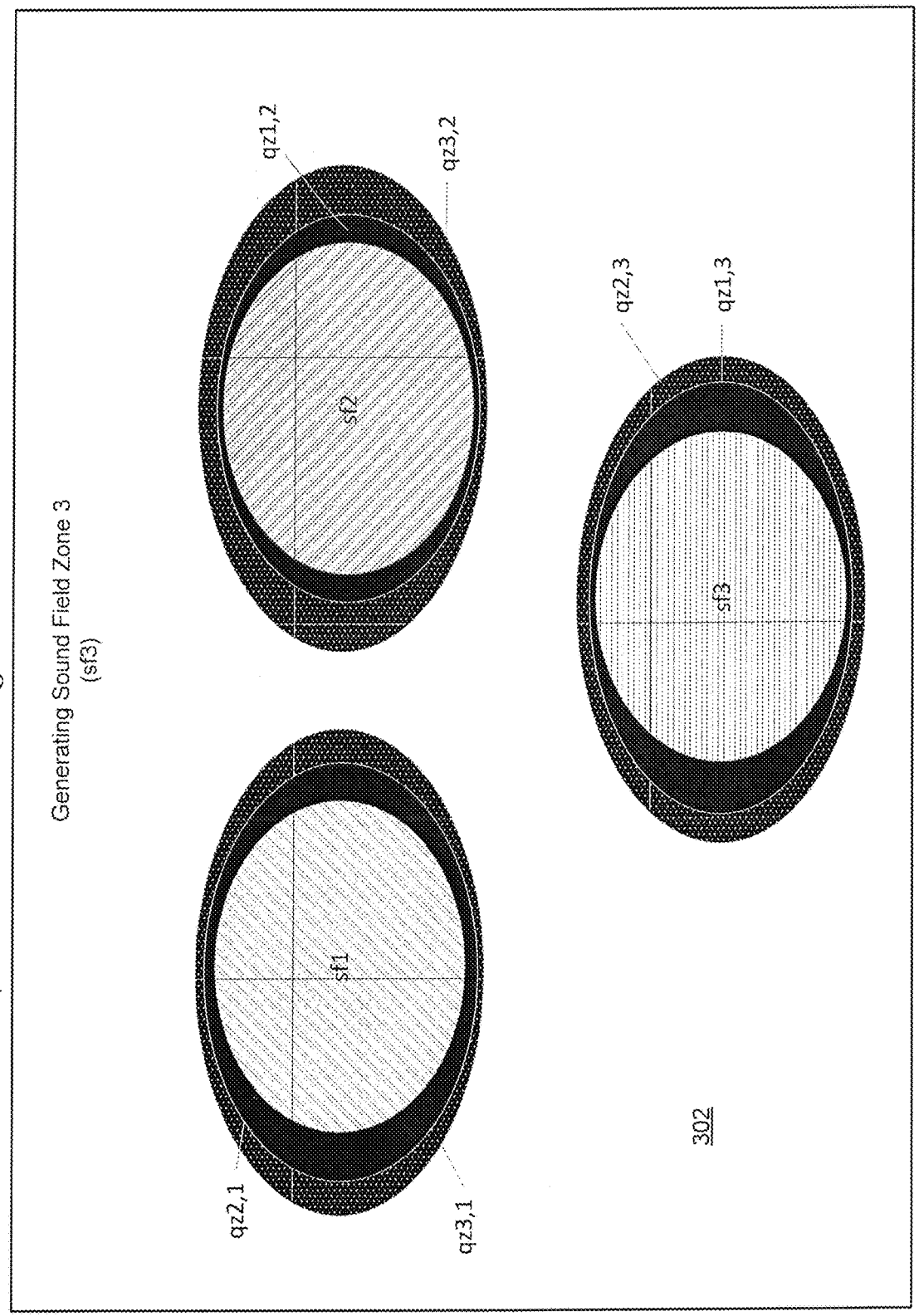

FIGS. 6A-6D illustrate a process of generating sound field zones and quiet zones of an auditory display in accordance with various embodiments. FIG. 6A shows an auditory display 300 having a sound field 302. The sound field 302 is designed to include three sound field zones sf1, sf2, and sf3 at the specific locations shown in FIG. 6A. FIGS. 6B-6D illustrate how each of the sound field zones and associated quiet zones are generated to create the three sound fields shown in FIG. 6A. The sound field and quiet zones are generated by the hearing device using a virtual loudspeaker array and audio processing (via a sound processor or digital signal processor (DSP)) which will be described hereinbelow.

FIG. 6B shows details concerning the generation of sound field zone sf1. The sound field zone sf1 is generated at the location shown in FIG. 6A. A first quiet zone, qz1,2, is generated at the location where the sound field zone sf2 will be created. The number 1 after the term qz in qz1,2 identifies the sound field zone whose sound is being attenuated, and the number 2 identifies the sound field zone where the quiet zone is located. As such, the first quiet zone, qz1,2 is located where the sound field zone sf2 will be created and is configured to attenuate sound emanating from the first sound field zone sf1. A second quiet zone, qz1,3, is generated at the location where the sound field zone sf3 will be created. The second quiet zone, qz1,3 is located where the sound field zone sf3 will be positioned and is configured to attenuate sound emanating from the first sound field zone sf1.

FIG. 6C shows details concerning the generation of sound field zone sf2. The sound field zone sf2 is generated at the location shown in FIG. 6A. A third quiet zone, qz2,1 is generated at the location of the first sound field zone sf1. The third quiet zone, qz2,1 is configured to attenuate sound emanating from the second sound field zone sf2. A fourth quiet zone, qz2,3 is generated at the location of the third sound field zone sf3. The fourth quiet zone, qz2,3 is configured to attenuate sound emanating from the second sound field zone sf2.

FIG. 6D shows details concerning the generation of sound field zone sf3. The sound field zone sf3 is generated at the location shown in FIG. 6A. A fifth quiet zone, qz3,1 is generated at the location of the first sound field zone sf1. The fifth quiet zone, qz3,1 is configured to attenuate sound emanating from the third sound field zone sf3. A sixth quiet zone, qz3,2 is generated at the location of the second sound field zone sf2. The sixth quiet zone, qz3,2 is configured to attenuate sound emanating from the third sound field zone sf3. The arrangement of quiet zones between the sound field zones provides acoustic contrast between the sound field zones of the sound field 302.

Figure 7:
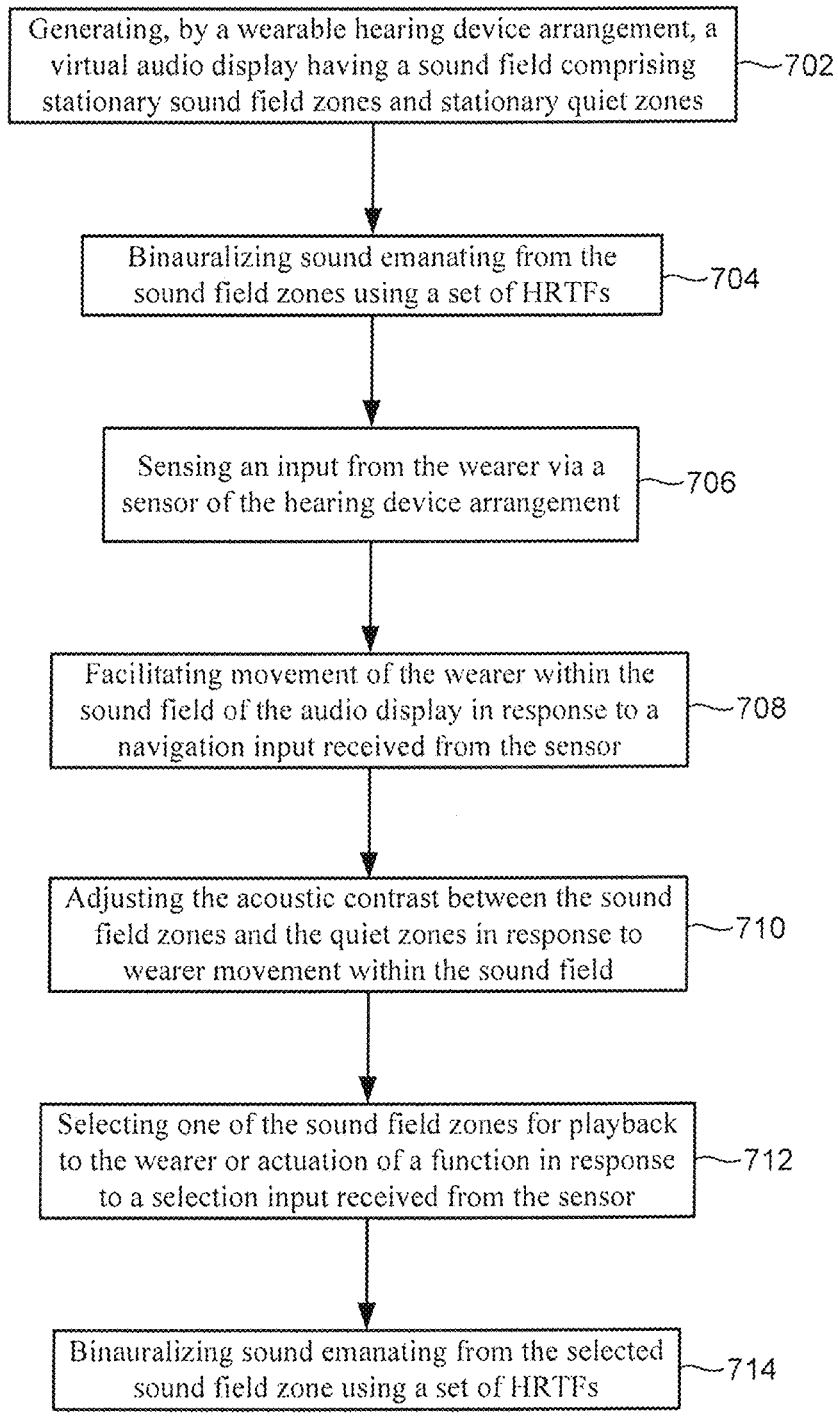
FIG. 7 is a flow diagram of a method implemented by an auditory display in accordance with various embodiments.

FIG. 7 is a flow diagram of a method implemented by an auditory display in accordance with various embodiments. The method shown in FIG. 7 involves generating 702, by a wearable hearing device arrangement, a virtual audio display having a sound field comprising stationary sound field zones and stationary quiet sounds, such as those shown in FIG. 6D. The method of FIG. 7 involves synthesizing 704 binaural sound emanating from the sound field zones using a set of head-related transfer functions (HRTFs). The method involves sensing 706 an input from the wearer via a sensor of the hearing device arrangement. The method also involves facilitating 708 movement of the wearer within the sound field of the audio display in response to a navigation input received from the sensor. The method further involves adjusting 710 the acoustic contrast between the sound field zones and the quiet zones in response to wearer movement within the sound field. The method also involves selecting 712 one of the sound field zones for playback to the wearer or actuation of a function in response to a selection input received from the sensor. The method further involves by binauralizing 714 sound emanating from the selected sound field zone using a set of HRTFs.

FIG. 8 illustrates a rendering setup for generating a sound field of a virtual auditory display with a quiet zone in accordance with various embodiments. Sound field synthesis techniques implemented in accordance with the disclosure aim at controlling a sound field within a bounded region 802 using actuators 803 at the boundary of this region. The elements of an array that contribute to synthesize a sound field are referred to as secondary sources 803, e.g., virtual loudspeakers. Although shown partially encircling the rendering region 802, it is understood that secondary sources 803 are typically distributed around the entirety of the rendering region 802. The primary source is the target of the synthesis, e.g., a point source emitting a speech signal or an audio stream of music.

A synthetic spatially diverse sound field in a certain 2- or 3-dimensional region that is bounded by a distribution of secondary sources 803, such as a circular array in the 2-dimensional case or a spherical loudspeaker array in the 3-dimensional case, can be described by finite impulse response (FIR) filters that determine together with the signal of the primary source by a convolution operation, the output signal of each loudspeaker signal. These FIR filters are called driving functions and are obtained analytically or numerically by deconvolving the desired sound field at a certain distribution of points by the Green's function describing the sound propagation in the rendering region 802 between the secondary sources 803 and the desired points. In FIG. 8, the region 802 bounded by the distribution of secondary sources 803 is referred to as the rendering region. The rendering region 802 can contain several zones bounded by closed boundaries. Each zone can be a superposition of the sound fields of several primary sources or a zone of quiet.

A synthesized sound field can contain virtual rigid boundaries. Synthesizing a sound field under the conditions of a virtual rigid boundary within the rendering region 802 allows the creation of a zone of quiet 804. Practically, to synthesize a sound field with zones of quiet 804 within a rendering region 802, the pressure (P) and velocity (V) are controlled along the boundary of a desired zone of quiet 804. The velocity is described mathematically by the following equation:

$$\vec{V}(\vec{x},\omega)=-1/j\omega\rho \operatorname{grad} P(\vec{x},\omega),$$

where j denote the complex unity, ρ denotes the density of the propagation medium, and ω denotes the radial frequency.

To control the velocity at a certain predefined boundary lying within the rendering region 802, an approximation can be made by considering the boundary as a two layers' boundary 806 and 808. This approximation allows the computation of the normal component of the velocity as a weighted finite difference of the pressure between the two layers 806 and 808 as depicted in FIG. 8.

A virtual rigid boundary should fulfill the Neumann boundary conditions constraining the normal velocity to be zero. To optimally control the sound field in the non-quiet (bright) zones (e.g., a sound field zone), techniques such as local sound field synthesis can be applied. Preferably, a soft scatterer fulfilling the Dirichlet boundary condition is virtually emulated along the desired zone.

As was discussed previously with reference to FIGS. 6A-6D, creating a sound field containing non-interfering zones (e.g., sound field zones) can be done iteratively, by creating one local bright zone jointly with zones of quiet which coincide with the locations of the desired other non-interfering bright zones. By exploiting the superposition principle, in a second iteration, the optimization goal is to create another bright zone coinciding with one of the already created quiet zones jointly with zones of quiet covering the other zones. This is repeated for each desired zone.

Figure 10:
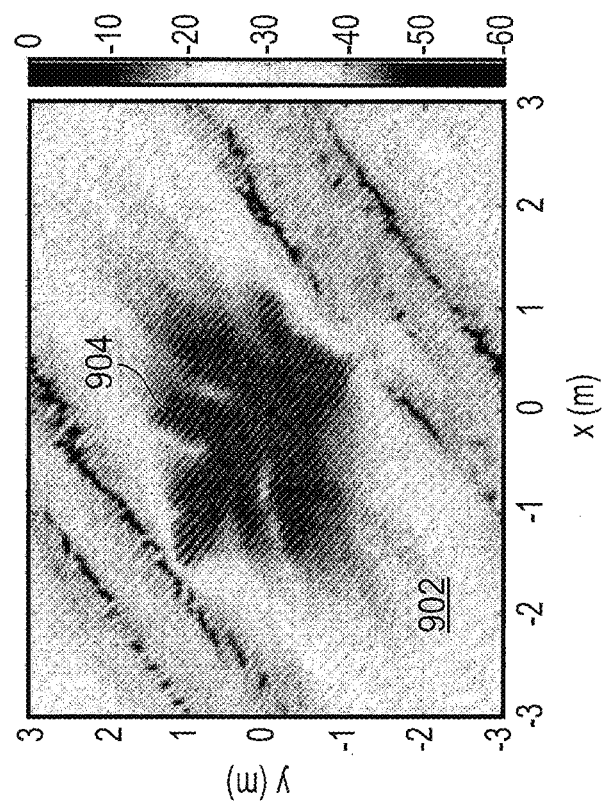
FIG. 10 shows the level distribution in dB of the synthesized sound field of FIG. 9.
Figure 9:
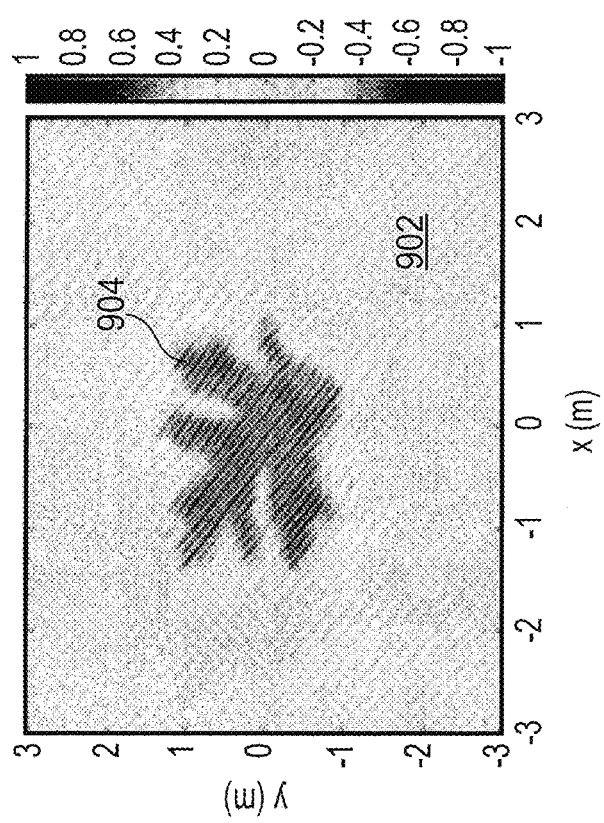
FIG. 9 shows a representative synthesized sound field in accordance with various embodiments.

It should be noted that the synthesis of zones of quiet using 2-dimensional arrays is limited to synthesizing either non-intersecting bright and quiet zones or zones of quiet which are entirely included in a bright zone. More flexibility can be achieved in a 3-dimensional rendering setup, as shown in FIGS. 9 and 10. FIG. 9 shows a synthesized sound field and FIG. 10 shows the level distribution in dB of the synthesized sound field of FIG. 9. In FIGS. 9 and 10, at a plane of interest, the bright zone 904 (the leaf-shaped sound field zone) is included in a zone of quiet 902. This can be achieved by simulating a 3-dimensional virtual rigid scatterer with a shape of the desired zone of quiet 902 in the x-y-plane and a limit in height (extension in the z-axis) to a length which is smaller than the array dimensions.

To auralize the synthesized diverse sound field according to various embodiments, a set of HRTFs are used, which are measured in an anechoic chamber. As is shown in FIG. 11, a traditional HRTF measurement is obtained by either placing a loudspeaker 1106 at a predefined distance from a dummy head 1103 and rotating the dummy head 1103 or by rotating the loudspeaker 1106 along a circle 1104 whose origin coincidences with the center of the dummy head 1103. For 3-dimensional measurements, two axes are typically used to obtain a virtual sphere of loudspeakers. This circle (sphere) is referred to as the measurement circle (sphere). Alternatively, HRTFs can be recorded from individual listeners or calculated from images of the listener's ear.

For purposes of explanation, a 2-dimensional setup is described with reference to FIG. 11. The measurement circle 1104 can be thought as the distribution of the secondary sources (e.g., virtual loudspeakers) used for sound field synthesis. To allow the hearing device wearer to scan the synthesized sound field from different perspectives which are not just different due to a head rotation but also due to a translation in the space, several measurements of HRTFs having the dummy head not only in the center of the measurement circle but scanning the space is needed according to various embodiments. This can be accomplished with a single HRTF measurement with the dummy head 1103 in the center of the measurement circle 1104.

Relaxing (untightening) the perspective of the wearer towards the soundscape from the perspective of the dummy head 1103 during the HRTF measurement can be achieved by exploiting the fact that the sound field synthesis is HRTF independent. For example, assume that a virtual sound field can be synthesized using an array of 360 virtual loudspeakers that encircle the sound field. A set of indexed HRTFs (e.g., a set of 360×2 filters {(h1,L, h1,R), ..., (hP,L, hP,R)}) can describe the sound propagation from each loudspeaker on a circle indexed by {1, ..., P} to the two microphones in the ears of the dummy head 1103, indexed by {L,R}, at a resolution of 1 degree. Having the array of 360 virtual loudspeakers provides for the synthesis of the sound of a virtual point source at any position in the space, which can be again achieved using a set of single-input/multiple output (SIMO) FIR filters. These filters can be obtained using sound field synthesis techniques such as wave-field synthesis or (near-field compensated) higher-order Ambisonics. Convolving the SIMO filters with the original HRTF dataset as a 360×2 multiple-input/multiple output (MIMO) FIR results in a 1×2 SIMO filter describing a new HRTF set that describes the propagation from the new virtual sound source to the ears of the dummy head 1103.

Figure 12:
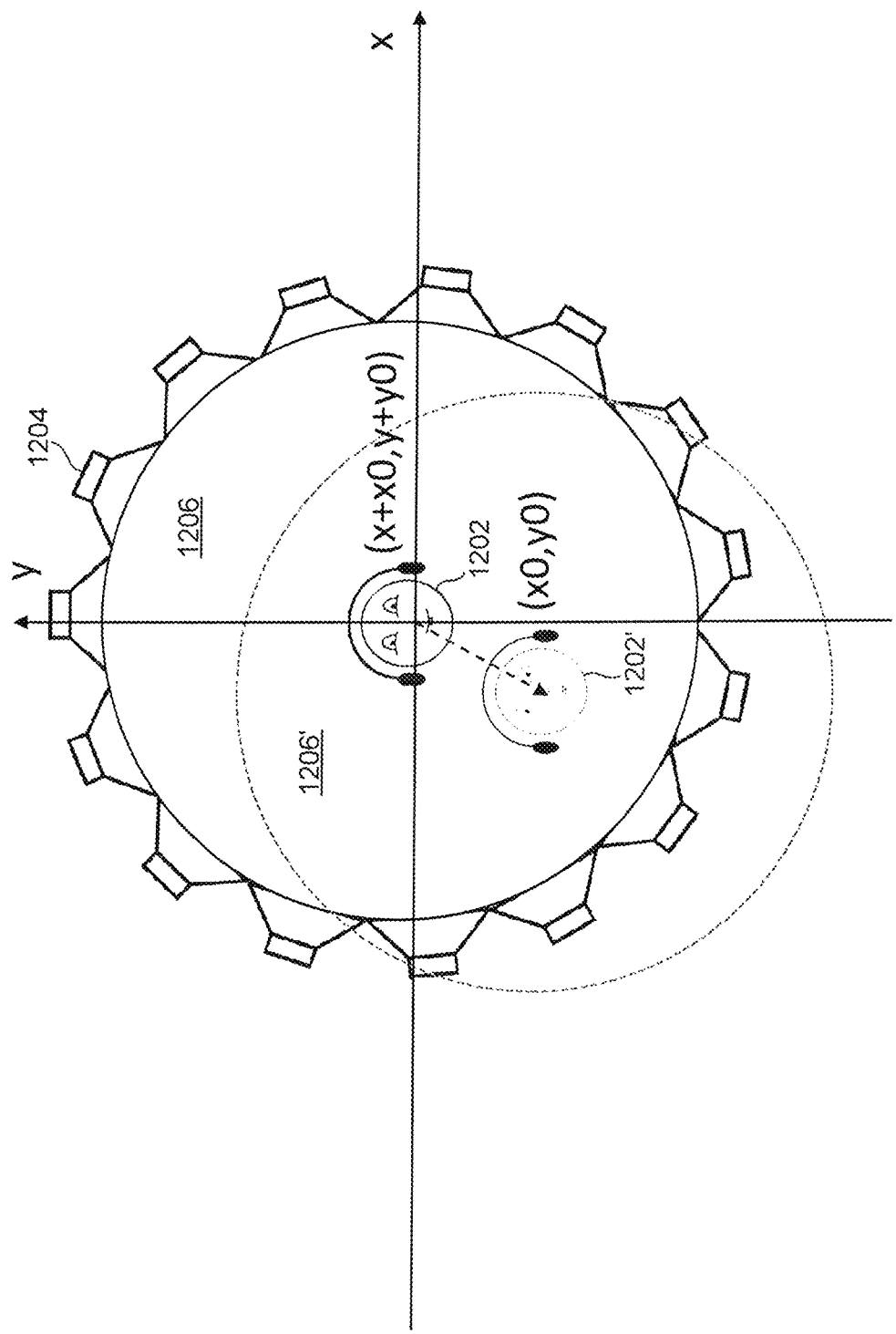
FIG. 12 illustrates a strategy for obtaining a set of HRTFs taking into account the relative movement of wearer with respect to a virtual loudspeaker array in accordance with various embodiments.

As such, the soundscape synthesis can be termed HRTF independent. Moreover, a wearer movement is equivalent to a translation of the inertial system whose origin was the wearer at the initial point. An example of this translation is illustrated in FIG. 12. FIG. 12 illustrates the strategy of obtaining a set of HRTFs taking into account the relative movement of wearer (from location 1202 to 1202') with respect to the virtual loudspeaker array 1204. The wearer's movement is equivalent to a movement of the array 1204 in the opposite direction (from location 1206 to 1206'). The new position (1206') of the array 1204 is used to synthesize virtual loudspeakers as point sources.

Facilitating movement (untightening the perspective) of the wearer within the synthesized sound field involves determining the HRTF between the old loudspeaker positions 1206 and the new wearer positions (e.g., 1202'). To do so, the old loudspeaker positions 1206 are synthesized as point sources in the translated inertial system single-input/multiple-output FIR filter, which can be expressed as a vector Dp of the dimension RL×1, where R is the HRTF dataset resolution and L the required filter length of the synthesis operator. The new set of HRTF for each ear is obtained as a convolution of each filter Dp for a loudspeaker P with the original HRTF. Similarly, head rotations of the wearer are equivalent to a rotation of the array 1204 in the opposite direction. Hence, to obtain the effect of rotating the head, the HRTF filters' indices are circularly shifted in the opposite direction to the head rotation.

Figure 13:
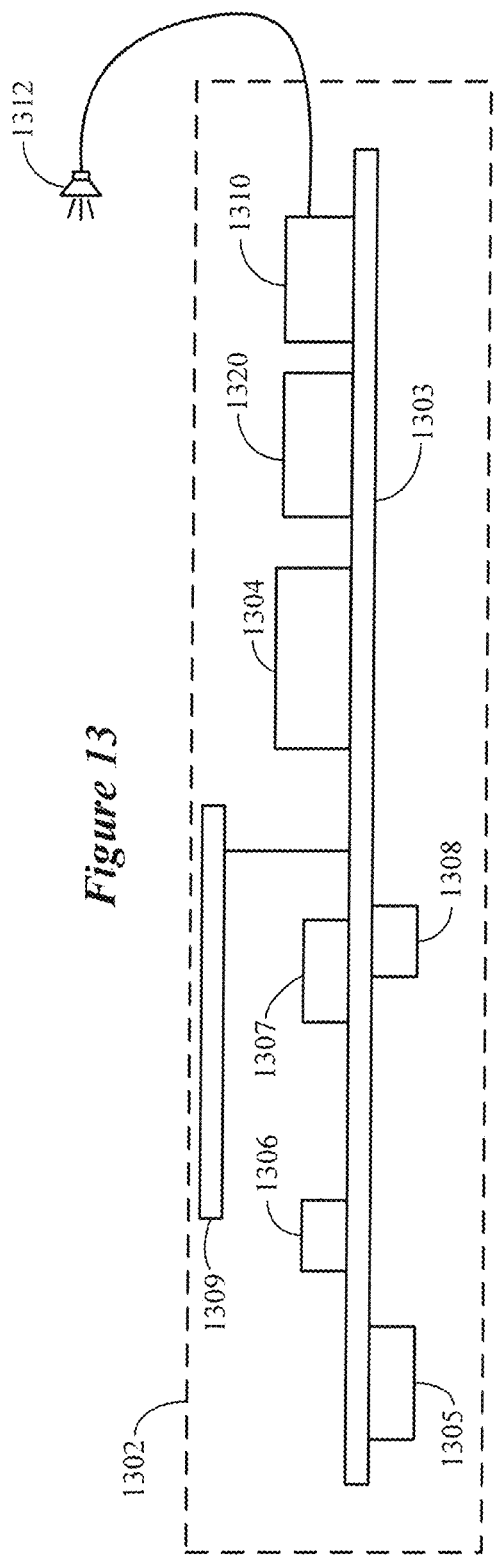
FIG. 13 is a block diagram showing various components of a hearing device that can be configured to implement an auditory display in accordance with various embodiments.
Figure 14:
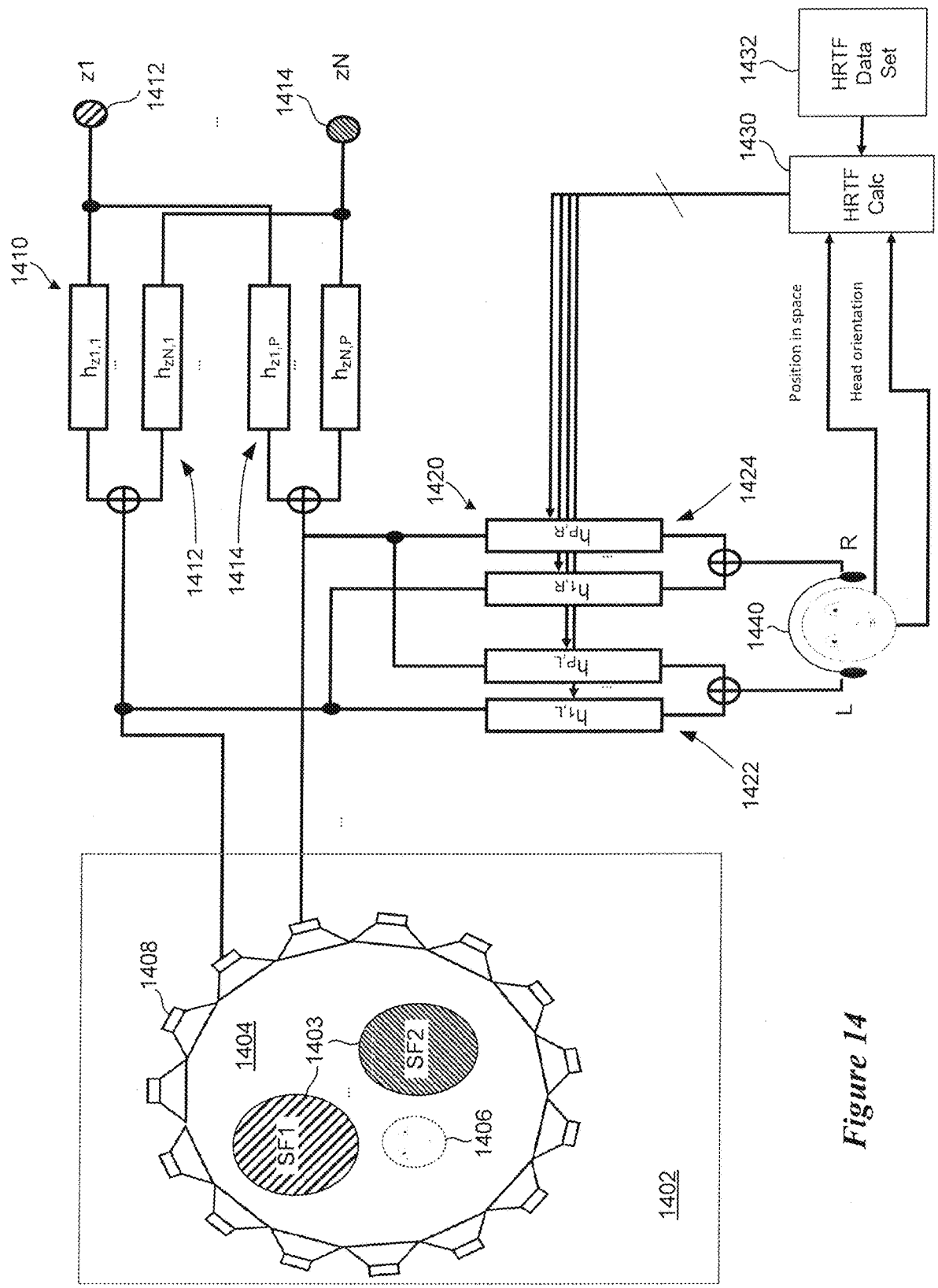
FIG. 14 is a block diagram showing various components of a hearing device that can be configured to implement an auditory display in accordance with various embodiments The figures are not necessarily to scale. Like numbers used in the figures refer to like components. However, it will be understood that the use of a number to refer to a component in a given figure is not intended to limit the component in another figure labeled with the same number.

FIGS. 13 and 14 are block diagrams showing various components of a hearing device that can be configured to implement an auditory display in accordance with various embodiments. The block diagram of FIG. 13 represents a generic hearing device for purposes of illustration. The circuity shown in FIG. 13 can be implemented to incorporate the circuitry shown in FIG. 14. It is understood that a hearing device may exclude some of the components shown in FIG. 13 and/or include additional components.

The hearing device 1302 shown in FIG. 13 includes several components electrically connected to a mother flexible circuit 1303. A battery 1305 is electrically connected to the mother flexible circuit 1303 and provides power to the various components of the hearing device 1302. One or more microphones 1306 are electrically connected to the mother flexible circuit 1303, which provides electrical communication between the microphones 1306 and a DSP 1304. Among other components, the DSP 1304 incorporates or is coupled to audio signal processing circuitry configured to implement an auditory display of the disclosure. In some embodiments, the DSP 1304 can incorporate the circuitry shown in FIG. 14. In other embodiments, the DSP 1304 is coupled to a processor or other circuitry that incorporates the circuitry shown in FIG. 14. One or more user switches 1308 (e.g., on/off, volume, mic directional settings) are electrically coupled to the DSP 1304 via the flexible mother circuit 1303. In some embodiments, some or all of the user switches 1308 can be excluded and their functions replaced by wearer interaction with an auditory display of the hearing device 1302.

An audio output device 1310 is electrically connected to the DSP 1304 via the flexible mother circuit 1303. In some embodiments, the audio output device 1310 comprises a speaker (coupled to an amplifier). In other embodiments, the audio output device 1310 comprises an amplifier coupled to an external receiver 1312 adapted for positioning within an ear of a wearer. The hearing device 1302 may incorporate a communication device 1307 coupled to the flexible mother circuit 1303 and to an antenna 1309 directly or indirectly via the flexible mother circuit 1303. The communication device 1307 can be a Bluetooth® transceiver, such as a BLE (Bluetooth® low energy) transceiver or other transceiver (e.g., an IEEE 802.11 compliant device). The communication device 1307 can be configured to receive a multiplicity of audio streams that can serve as primary sources of a sound field synthesized in accordance with various embodiments.

FIG. 14 shows various components of a hearing device that cooperate to provide a user interactive auditory display in accordance with various embodiments. As was discussed previously, the components shown in FIG. 14 can be integral to the DSP 1304 or coupled to the DSP 1304. In the example shown in FIG. 14, an auditory display 1402 is depicted which includes a sound field 1404 comprising two independent sound field zones 1403, sf1 and sf2. Although not explicitly shown in FIG. 14, the sound field 1404 includes a number of quiet zones that provide acoustic contrast between the two sound field zones 1403. The perspective (location) of the hearing device wearer 1406 within the sound field 1404 is also shown. The sound field 1404 is synthesized using an array of virtual loudspeakers 1408.

The auditory display circuitry includes a set of synthesis FIR filters 1410 and a set of binauralizing FIR filters 1420. The synthesis FIR filters 1410 include a first filter set 1412 for N independent sound field zones 1403. The synthesis FIR filters 1410 include a second filter set 1414 for P virtual loudspeakers 1408. The binauralizing FIR filters 1420 include a left (L) filter set 1422 and a right (R) filter set 1424 for P virtual loudspeakers 1408. For simplicity, the number of synthesis FIR filters 1410 and binauralizing FIR filters 1420 shown in FIG. 14 is based on connections to two of P virtual loudspeakers 1408 and two of N sound field zones 1403. Two inputs (z1 and zN) of the synthesis FIR filters 1410 are shown, each of which receives a different primary electronic/digital source input (e.g., a sound, an audio stream, a voice prompt). The input z1 corresponds to the sound field zone sf1, and the input zN corresponds to the sound field zone sf2 in this illustrative example. The circuitry also includes HRTF calculation circuitry 1430 and a memory of HRTF data sets 1432. A wearer is shown wearing a hearing device arrangement 1440 which includes left (L) and right (R) speakers. Although the hearing device arrangement 1440 is illustrated as a headset, it is understood that the hearing device arrangement 1440 represents any kind of hearable device (e.g., left and right hearing instruments or hearables).

The target sound field 1404 has N independent sound field zones 1403 described by a MIMO system of the size of N inputs and P outputs. In each of the sound field zones 1403, specific audio material which is represented as a mono audio channel can be played independently of the other sound field zones 1403. The sound field 1404 describing the auditory display 1402 is synthesized by filtering the N mono channels with the MIMO filter of the size N×P obtaining P virtual loudspeaker channels. P is also the number of the virtual loudspeakers used during the HRTF measurement via the HRTF calculation circuit 1430. Hence, the HRTF data set 1432 is described by a MIMO system with P inputs and 2 outputs.

According to the wearer's position in the space, which can be inferred using localization algorithms (e.g., audio based localization of the microphones in the hearing device), a new dataset of HRTF is calculated according to the methods described hereinabove. Additionally, according to the wearer's head orientation, which can be obtained by dedicated sensors (e.g., accelerometer and a gyroscope integrated in the hearing device), the indices of the synthesized HRTF is circularly shifted accordingly and the P original virtual loudspeaker channels are filtered with the new calculated HRTF offering 2 signals which are finally represented to the wearer as left and right ear signals via the hearing device arrangement 1440.

This document discloses numerous embodiments, including but not limited to the following:

Item 1 is a method implemented by a hearing device arrangement adapted to be worn by a wearer, the method comprising:
  generating, by the hearing device arrangement, a virtual auditory display comprising a sound field, a plurality of disparate sound field zones, and a plurality of quiet zones that provide acoustic contrast between the sound field zones, the sound field zones and the quiet zones remaining positionally stationary within the sound field;
  sensing an input from the wearer via one or more sensors at the hearing device arrangement;
  facilitating movement of the wearer within the sound field in response to a navigation input received from the one or more sensors; and
  selecting one of the sound field zones for playback to the wearer or actuation of a function by the hearing device arrangement in response to a selection input received from the one or more sensors.

Item 2 is the method of item 1, wherein generating comprises:
  generating N disparate sound field zones; and
  generating at least N−1 quiet zones.

Item 3 is the method of item 1, wherein facilitating wearer movement comprises facilitating virtual or actual movement of the wearer within the sound field.

Item 4 is the method of item 1, wherein generating the virtual auditory display comprises simultaneously or sequentially playing back sound from each of the sound field zones.

Item 5 is the method of item 1, comprising adjusting wearer-perceived amplitude and directionality of sound emanating from the sound field zones in response to movement of the wearer within the sound field.

Item 6 is the method of item 1, comprising binauralizing sound emanating from the sound field zones using a set of head related transfer functions (HRTFs).

Item 7 is the method of item 6, comprising:
  synthesizing the sound field using virtual loudspeakers;
  wherein the set of HRTFs are calculated based on synthesizing the virtual loudspeakers.

Item 8 is the method of item 1, wherein the one or more sensors are configured to sense movement of one or both of the wearer's head and body.

Item 9 is the method of item 1, wherein the one or more sensors comprise one or both of an electrooculographic (EOG) sensor and an electroencephalographic (EEG) sensor.

Item 10 is the method of item 1, wherein at least some of the sound field zones are associated with a separate audio stream.

Item 11 is the method of item 1, comprising wirelessly receiving a plurality of audio streams from one or more sources.

Item 12 is the method of item 1, further comprising selectively activating and deactivating the virtual auditory display in response to a voice command or an input received from the one or more sensors.

Item 13 is an apparatus, comprising:
  a pair of hearing devices configured to be worn by a wearer, each hearing device comprising:
    a processor configured to generate a virtual auditory display comprising a sound field, a plurality of disparate sound field zones, and a plurality of quiet zones that provide acoustic contrast between the sound field zones, the sound field zones and the quiet zones remaining positionally stationary within the sound field;
    one or more sensors configured to sense a plurality of inputs from the wearer, the processor configured to facilitate movement of the wearer within the sound field in response to a navigation input received from the one or more sensors; and
    a speaker;
    wherein the processor is configured to select one of the sound field zones for playback via the speaker or actuation of a hearing device function in response to a selection input received from the one or more sensors.

Item 14 is the apparatus of item 13, wherein the processor is configured to generate N disparate sound field zones and at least N−1 quiet zones.

Item 15 is the apparatus of item 13, wherein the processor is configured to facilitate virtual or actual movement of the wearer within the sound field in response to the navigation input received from the one or more sensors.

Item 16 is the apparatus of item 13, wherein:
  the processor is operable in a navigation mode and a selection mode;
  the processor is configured to simultaneously or sequentially play back sound from each of the sound field zones via the speaker in the navigation mode; and
  the processor is configured to play back sound from the selected sound field zone via the speaker or actuate a hearing device function in the selection mode.

Item 17 is the apparatus of item 13, wherein the processor is configured to adjust wearer-perceived amplitude and directionality of sound emanating from the sound field zones in response to movement of the wearer within the sound field.

Item 18 is the apparatus of item 13, wherein the processor is configured to binauralize sound emanating from the sound field zones using a set of head related transfer functions (HRTFs).

Item 19 is the apparatus of item 13, wherein:
  the sound field is synthesized using virtual loudspeakers; and
  the set of HRTFs are calculated based on synthesizing the virtual loudspeakers.

Item 20 is the apparatus of item 13, wherein the processor is configured to modify a set of filters for adjusting the acoustic contrast between the sound field zones and the quiet zones in response to movement of the wearer within the sound field.

Item 21 is the apparatus of item 13, wherein the one or more sensors are configured to sense movement of one or both of the wearer's head and body.

Item 22 is the apparatus of item 13, wherein the one or more sensors comprise one or both of an electrooculographic (EOG) sensor and an electroencephalographic (EEG) sensor.

Item 23 is the apparatus of item 13, wherein at least some of the sound field zones are associated with a separate audio stream received by a wireless transceiver of the hearing device.

Item 24 is the apparatus of item 13, wherein the virtual auditory display is configured for selective activation and deactivation in response to a voice command received by a microphone of the hearing device or an input received by the processor from the one or more sensors.

Although the subject matter has been described in language specific to structural features and/or methodological acts, it is to be understood that the subject matter defined in the appended claims is not necessarily limited to the specific features or acts described above. Rather, the specific features and acts described above are disclosed as representative forms of implementing the claims.

What is claimed is:

1. A method implemented by a hearing device arrangement worn by a wearer, the method comprising:
   generating, by the hearing device arrangement, a virtual auditory display comprising a sound field containing a plurality of disparate sound field zones and a plurality of quiet zones that provide acoustic contrast between the sound field zones, wherein each sound field zone is associated with a quiet zone coinciding with a location of other sound field zones;
   sensing an input from the wearer via one or more sensors at the hearing device arrangement;
   facilitating movement of the wearer within the sound field in response to a navigation input received from the one or more sensors; and
   selecting one of the sound field zones for playback to the wearer or to actuate a function by the hearing device arrangement in response to a selection input received from the one or more sensors.

2. The method of claim 1, wherein the quiet zones define hard sound boundaries between the sound field zones.

3. The method of claim 1, wherein the sound field zones and the quiet zones remain positionally stationary within the sound field.

4. The method of claim 1, wherein generating comprises:
   generating N disparate sound field zones; and
   generating at least N−1 quiet zones.

5. The method of claim 1, wherein facilitating wearer movement comprises facilitating virtual or actual movement of the wearer within the sound field.

6. The method of claim 1, wherein generating the virtual auditory display comprises simultaneously or sequentially playing back sound from each of the sound field zones.

7. The method of claim 1, comprising adjusting wearer-perceived amplitude and directionality of sound emanating from the sound field zones in response to movement of the wearer within the sound field.

8. The method of claim 1, comprising binauralizing sound emanating from the sound field zones using a set of head related transfer functions (HRTFs).

9. The method of claim 1, wherein the one or more sensors are configured to sense movement of one or both of the wearer's head and body.

10. The method of claim 1, wherein the one or more sensors comprise one or both of an electrooculographic (EOG) sensor and an electroencephalographic (EEG) sensor.

11. The method of claim 1, wherein at least some of the sound field zones are associated with a separate audio stream.

12. The method of claim 1, further comprising selectively activating and deactivating the virtual auditory display in response to a voice command or an input received from the one or more sensors.

13. An apparatus, comprising:
   a pair of hearing devices configured to be worn by a wearer, each hearing device comprising:
      a processor configured to generate a virtual auditory display comprising a sound field containing a plurality of disparate sound field zones and a plurality of quiet zones that provide acoustic contrast between the sound field zones, wherein each sound field zone is associated with a quiet zone coinciding with a location of other sound field zones;
      one or more sensors configured to sense an input from the wearer, the processor configured to facilitate movement of the wearer within the sound field in response to a navigation input received from the one or more sensors; and
      a speaker;
      wherein the processor is configured to select one of the sound field zones for playback via the speaker or to actuate a hearing device function in response to a selection input received from the one or more sensors.

14. The apparatus of claim 13, wherein the quiet zones define hard sound boundaries between the sound field zones.

15. The apparatus of claim 13, wherein the sound field zones and the quiet zones remain positionally stationary within the sound field.

16. The apparatus of claim 13, wherein the processor is configured to generate N disparate sound field zones and at least N−1 quiet zones.

17. The apparatus of claim 13, wherein the processor is configured to facilitate virtual or actual movement of the wearer within the sound field in response to the navigation input received from the one or more sensors.

18. The apparatus of claim 13, wherein:
   the processor is operable in a navigation mode and a selection mode;
   the processor is configured to simultaneously or sequentially play back sound from each of the sound field zones via the speaker in the navigation mode; and
   the processor is configured to play back sound from the selected sound field zone via the speaker or actuate a hearing device function in the selection mode.

19. The apparatus of claim 13, wherein the processor is configured to adjust wearer-perceived amplitude and directionality of sound emanating from the sound field zones in response to movement of the wearer within the sound field.

20. The apparatus of claim 13, wherein the processor is configured to binauralize sound emanating from the sound field zones using a set of head related transfer functions (HRTFs).

21. The apparatus of claim 13, wherein the processor is configured to modify a set of filters for adjusting the acoustic contrast between the sound field zones and the quiet zones in response to movement of the wearer within the sound field.

22. The apparatus of claim 13, wherein the one or more sensors are configured to sense movement of one or both of the wearer's head and body.

23. The apparatus of claim 13, wherein the one or more sensors comprise one or both of an electrooculographic (EOG) sensor and an electroencephalographic (EEG) sensor.

24. The apparatus of claim 13, wherein at least some of the sound field zones are associated with a separate audio stream received by a wireless transceiver of the hearing device.

25. The apparatus of claim 13, wherein the virtual auditory display is configured for selective activation and deactivation in response to a voice command received by a microphone of the hearing device or an input received by the processor from the one or more sensors.

* * * * *